United States Patent
Akutsu et al.

(10) Patent No.: US 12,444,238 B2
(45) Date of Patent: *Oct. 14, 2025

(54) AUTHENTICATION CONTROL DEVICE, AUTHENTICATION SYSTEM, AUTHENTICATION CONTROL METHOD AND NON-TRANSITORY COMPUTER READABLE MEDIUM

(71) Applicant: NEC Corporation, Tokyo (JP)

(72) Inventors: Tatsuki Akutsu, Tokyo (JP); Akiko Ide, Tokyo (JP)

(73) Assignee: NEC CORPORATION, Tokyo (JP)

( * ) Notice: Subject to any disclaimer, the term of this patent is extended or adjusted under 35 U.S.C. 154(b) by 429 days.

This patent is subject to a terminal disclaimer.

(21) Appl. No.: 17/911,717

(22) PCT Filed: Mar. 31, 2020

(86) PCT No.: PCT/JP2020/014738
§ 371 (c)(1),
(2) Date: Sep. 15, 2022

(87) PCT Pub. No.: WO2021/199234
PCT Pub. Date: Oct. 7, 2021

(65) Prior Publication Data
US 2023/0116514 A1    Apr. 13, 2023

(51) Int. Cl.
*G06V 40/60*  (2022.01)
*G06F 21/32*  (2013.01)
(Continued)

(52) U.S. Cl.
CPC ............ *G06V 40/67* (2022.01); *G06F 21/32* (2013.01); *G06F 21/6245* (2013.01); *G06T 7/20* (2013.01);
(Continued)

(58) Field of Classification Search
CPC .... G06V 40/67; G06V 40/171; G06V 40/172; G06V 40/25; G06V 40/50; G06V 10/62;
(Continued)

(56) References Cited

U.S. PATENT DOCUMENTS

| | | | |
|---|---|---|---|
| 2009/0087041 A1* | 4/2009 | Hasebe | G06V 40/161 |
| | | | 382/118 |
| 2015/0029223 A1 | 1/2015 | Kaino et al. | |
| 2017/0160626 A1 | 6/2017 | Muramatsu | |

FOREIGN PATENT DOCUMENTS

| | | |
|---|---|---|
| JP | 2002-302016 A | 10/2002 |
| JP | 2009-032116 A | 2/2009 |

(Continued)

OTHER PUBLICATIONS

JP Office Action for JP Application No. 2022-512959, mailed on May 28, 2024 with English Translation.
(Continued)

*Primary Examiner* — Samir A Ahmed

(57) ABSTRACT

An authentication control device according to the present disclosure is provided with an image acquisition means for acquiring an image including an authentication object person walking in the monitoring area photographed by a camera for photographing the monitoring area, an authentication control means for causing an authentication device for performing face authentication to perform face authentication of the authentication object person included in the image acquired by the image acquisition means, a projection area specification means for specifying a projection area in which the result of the face authentication is projected, and a projection control means for causing the projection device to project the result of the face authentication on the projection area specified by the projection area specification means.

24 Claims, 26 Drawing Sheets

(51) Int. Cl.
*G06F 21/62* (2013.01)
*G06T 7/20* (2017.01)
*G06V 40/16* (2022.01)
*G06V 40/20* (2022.01)
*G06V 40/50* (2022.01)

(52) U.S. Cl.
CPC .......... *G06V 40/171* (2022.01); *G06V 40/172* (2022.01); *G06V 40/25* (2022.01); *G06V 40/50* (2022.01); *G06T 2207/30201* (2013.01); *G06V 40/16* (2022.01)

(58) Field of Classification Search
CPC ...... G06V 20/52; G06V 40/166; G06V 40/16; G06T 7/20; G06T 2207/30201; G06F 21/32; G06F 21/6245; G08B 13/00; G08B 25/04
See application file for complete search history.

(56) References Cited

FOREIGN PATENT DOCUMENTS

| | | |
|---|---|---|
| JP | 2012-156817 A | 8/2012 |
| JP | 2013-101551 A | 5/2013 |
| JP | 2013-235373 A | 11/2013 |
| JP | 2014219704 A * | 11/2014 |
| WO | 2016/103560 A1 | 6/2016 |

OTHER PUBLICATIONS

International Search Report for PCT Application No. PCT/JP2020/014738, mailed on May 26, 2020.

* cited by examiner

AUTHENTICATION CONTROL DEVICE, AUTHENTICATION SYSTEM, AUTHENTICATION CONTROL METHOD AND NON-TRANSITORY COMPUTER READABLE MEDIUM

This application is a National Stage Entry of PCT/JP2020/014738 filed on Mar. 31, 2020, the contents of all of which are incorporated herein by reference, in their entirety.

TECHNICAL FIELD

The present disclosure relates to authentication control device, authentication system, authentication control method and non-transitory computer readable medium.

BACKGROUND ART

A walk-through type authentication system is disclosed, for example, in Patent Literature 1, which extracts a face area image from an image of a person during walking and performs authentication based on the face area image and the registered face image.

CITATION LIST

Patent Literature

Patent Literature 1: Japanese Unexamined Patent Application Publication No. 2013-101551

SUMMARY OF INVENTION

Technical Problem

However, in the system described in Patent Literature 1, it is not proposed that the authentication result is alarmed in association with the authentication object person.

An object of the present disclosure is to provide authentication control device, authentication system, authentication control method and non-transitory computer readable medium capable of alarming authentication result in association with authentication object person.

Solution to Problem

An authentication control device according to a first aspect of the present disclosure includes: an image acquisition means for acquiring an image including an authentication object person walking in the monitoring area photographed by a camera for photographing the monitoring area; an authentication control means for causing an authentication device for performing face authentication to perform face authentication of the authentication object person included in the image acquired by the image acquisition means; a projection area specification means for specifying a projection area in which the result of the face authentication is projected; and a projection control means for causing the projection device to project the result of the face authentication on the projection area specified by the projection area specification means.

An authentication control device according to a second aspect of the present disclosure includes: an image acquisition means for acquiring an image including an authentication object person walking toward a projection zone in the monitoring area photographed by a camera for photographing the monitoring area; an authentication control means for causing an authentication device for performing face authentication to perform face authentication of the authentication object person included in the image acquired by the image acquisition means; and a projection control means for causing the projection device to project the result of the face authentication to the projection zone, when the authentication object person included in the image acquired by the image acquisition means reaches the projection zone.

An authentication system according to a third aspect of the present disclosure includes: a camera for photographing a monitoring area; a projection device; an authentication device for performing face authentication; an image acquisition means for acquiring an image including an authentication object person walking in the monitoring area photographed by the camera; an authentication control means for causing the authentication device to perform face authentication of the authentication object person included in the image acquired by the image acquisition means; a projection area specification means for specifying a projection area in which the result of the face authentication is projected; and a projection control means for causing the projection device to project the result of the face authentication on the projection area specified by the projection area specification means.

An authentication system according to a fourth aspect of the present disclosure includes: a camera for photographing a monitoring area; a projection device; an authentication device for performing face authentication; an image acquisition means for acquiring an image including an authentication object person walking toward a projection zone in the monitoring area photographed by the camera; an authentication control means for causing the authentication device to perform face authentication of the authentication object person included in the image acquired by the image acquisition means; and a projection control means for causing the projection device to project the result of the face authentication to the projection zone, when the authentication object person included in the image acquired by the image acquisition means reaches the projection zone.

An authentication control method according to a fifth aspect of the present disclosure includes: an image acquisition step of acquiring an image including an authentication object person walking in the monitoring area photographed by a camera for photographing the monitoring area; an authentication control step of causing an authentication device for performing face authentication to perform face authentication of the authentication object person included in the image acquired by the image acquisition step; a projection area specification step of specifying a projection area in which the result of the face authentication is projected; and a projection control step of causing the projection device to project the result of the face authentication on the projection area specified by the projection area specification step.

An authentication control method according to a sixth aspect of the present disclosure includes: an image acquisition step of acquiring an image including an authenticated subject walking toward a projection zone in the monitoring area photographed by a camera for photographing the monitoring area; an authentication control step of causing an authentication device for performing face authentication to perform face authentication of the authentication object person included in the image acquired by the image acquisition step; and a projection control step for causing the projection device to project the result of the face authentication to the projection zone, when the authentication object person included in the image acquired by the image acquisition step reaches the projection zone.

A non-transitory computer readable medium according to a seventh aspect of the present disclosure is a non-transitory computer readable medium storing a program for causing an electronic device having at least one processor to execute: an image acquisition processing for acquiring an image including an authentication object person walking in the monitoring area photographed by a camera for photographing the monitoring area; an authentication control processing for causing an authentication device for performing face authentication to perform face authentication of the authentication object person included in the image acquired by the image acquisition processing; a projection area specification processing for specifying a projection area in which the result of the face authentication is projected; and a projection control processing for causing the projection device to project the result of the face authentication on the projection area specified by the projection area specification processing.

A non-transitory computer readable medium according to a eighth aspect of the present disclosure is a non-transitory computer readable medium storing a program for causing an electronic device having at least one processor to execute: an image acquisition processing for acquiring an image including an authenticated subject walking toward a projection zone in the monitoring area photographed by a camera for photographing the monitoring area; an authentication control processing for causing an authentication device for performing face authentication to perform face authentication of the authentication object person included in the image acquired by the image acquisition processing; and a projection control processing for causing the projection device to project the result of the face authentication to the projection zone, when the authentication object person included in the image acquired by the image acquisition processing reaches the projection zone.

Advantageous Effects of Invention

According to the present disclosure, it is possible to provide authentication control device, authentication system, authentication control method and non-transitory computer readable medium capable of alarming authentication result in association with authentication object person.

EXAMPLE EMBODIMENT

Embodiment 1

First, with reference to FIG. 1, an example of the configuration of an authentication control device 20 constituting an authentication system 1 of the first embodiment will be described.

Figure 1:
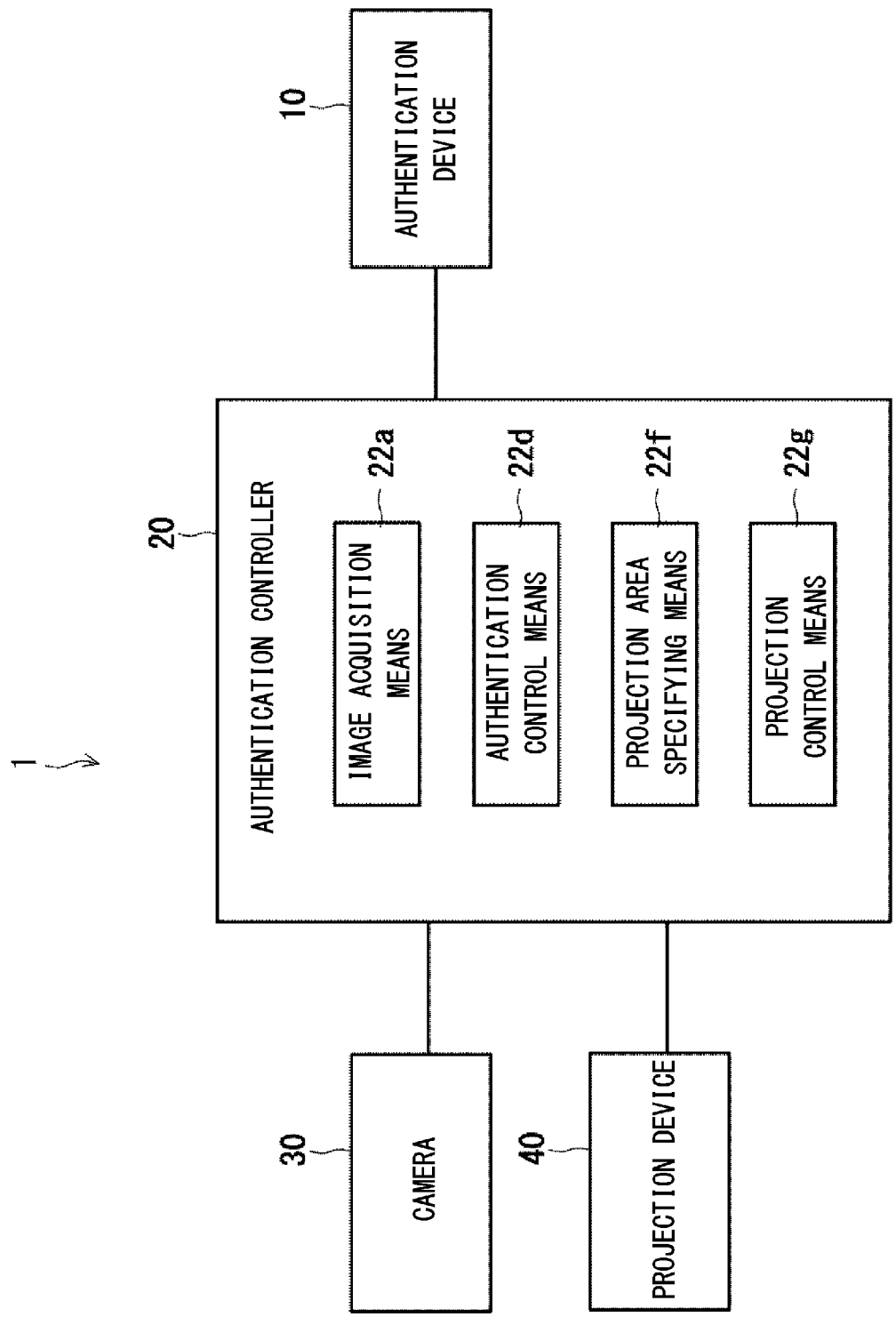
FIG. 1 is a schematic configuration diagram of the authentication control device 20.

FIG. 1 is a schematic configuration diagram of the authentication control device 20.

As shown in FIG. 1, the authentication control device 20 is provided with an image acquisition means 22a for acquiring an image including an authentication object person walking in a monitoring area photographed by a camera 30 for photographing the monitoring area, an authentication control means 22d for causing an authentication device 10 for performing face authentication to perform face authentication of the authentication object person included in the image acquired by the image acquisition means 22a, a projection area specification means 22f for specifying a projection area in which the result of the face authentication is projected, and a projection control means 22g for causing a projection device 40 to project the result of the face authentication on the projection area specified by the projection area specification means 22f.

Next, an example of the operation of the authentication control device 20 having the above configuration will be described.

Figure 2:
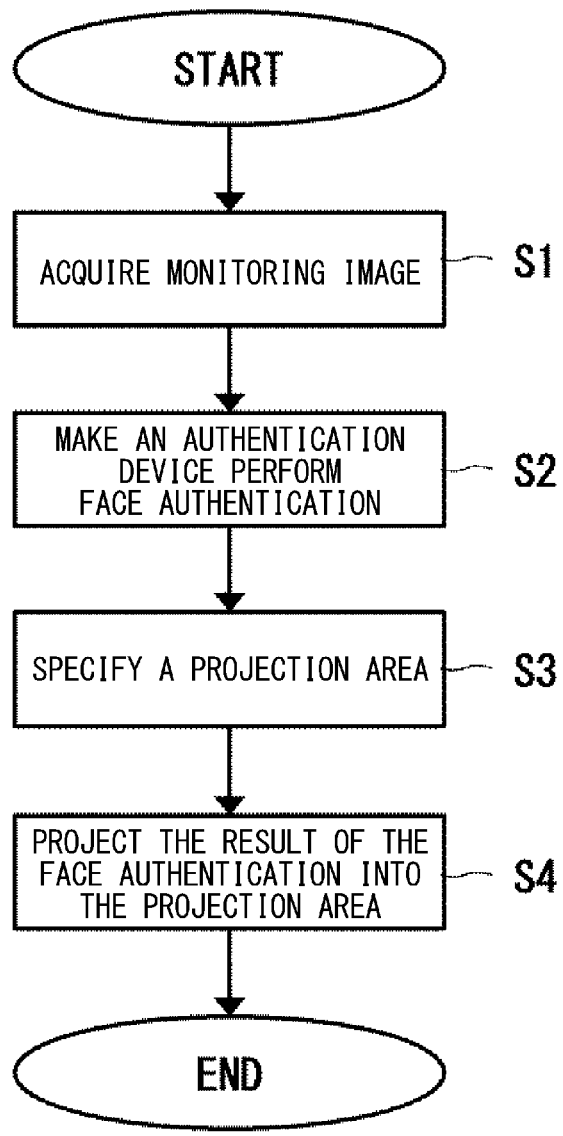
FIG. 2 is a flowchart showing an example of the operation of the authentication control device 20.

FIG. 2 is a flowchart showing an example of the operation of the authentication control device 20.

First, the image acquisition means 22a acquires a monitoring image (a monitoring image including an authentication object person walking in the monitoring area) photographed by the camera 30 photographing the monitoring area (Step S1). Next, the authentication control means 22d causes the authentication device 10 for performing face authentication to perform face authentication of the authentication object person included in the monitoring image acquired by the image acquisition means 22a (Step S2). Next, the projection area specification means 22f specifies a projection area where the result of the face authentication is projected (Step S3). Next, the projection control means 22g causes the projection device 40 to project the result of the face authentication on the projection area specified by the projection area specification means 22f (Step S4).

As described above, according to the first embodiment, the authentication result can be projected (alarmed) in association with the authentication object person. This reduces, for example, the monitoring burden of a security guard.

Embodiment 2

The authentication system 1 will now be described in detail as Embodiment 2 of the present disclosure. Hereinafter, an image acquisition unit is used as the image acquisition means 22a. Hereinafter, the image acquisition unit will be referred to as the image acquisition unit 22a. An authentication control unit is used as the authentication control means 22d. Hereinafter, the authentication control unit will be referred to as the authentication control unit 22d. A projection area specification unit is used as the projection area specification means 22f. Hereinafter, the projection area specification unit will be referred to as the projection area specification unit 22f. A projection control unit is used as the projection control means 22g. Hereinafter, the projection control unit will be referred to as the projection control unit 22g.

Figure 3:
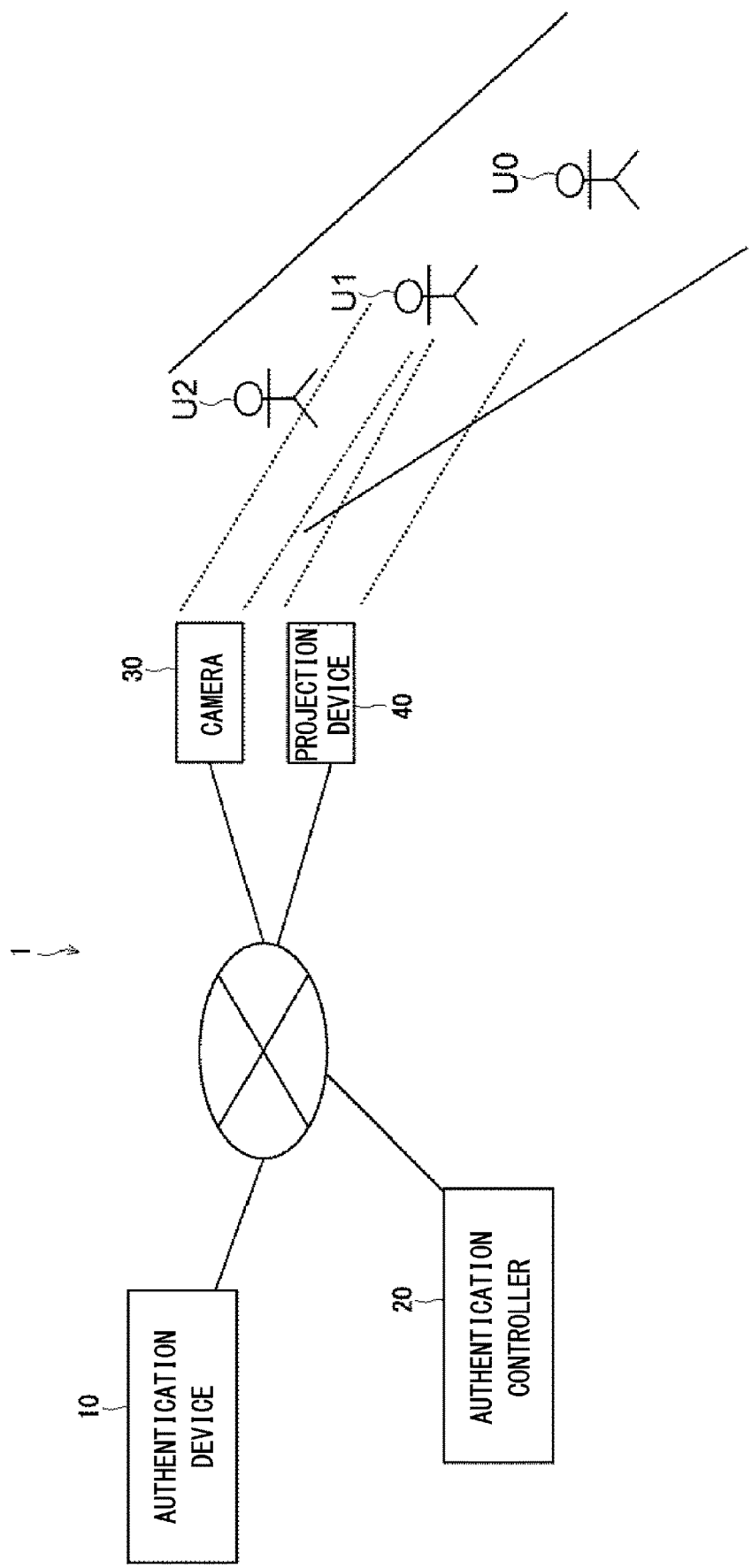
FIG. 3 is a block diagram showing the configuration of the authentication system according to the second embodiment.

FIG. 3 is a block diagram showing the configuration of the authentication system according to the second embodiment.

The authentication system 1 includes an authentication device 10, an authentication control device 20, a camera 30, and a projection device 40 which can communicate with each other via a network NW (For example, the Internet). Note that part or all of the authentication control device 20, the camera 30, and the projection device 40 may be integrated.

First, an outline of the second embodiment will be described.

Figure 4:
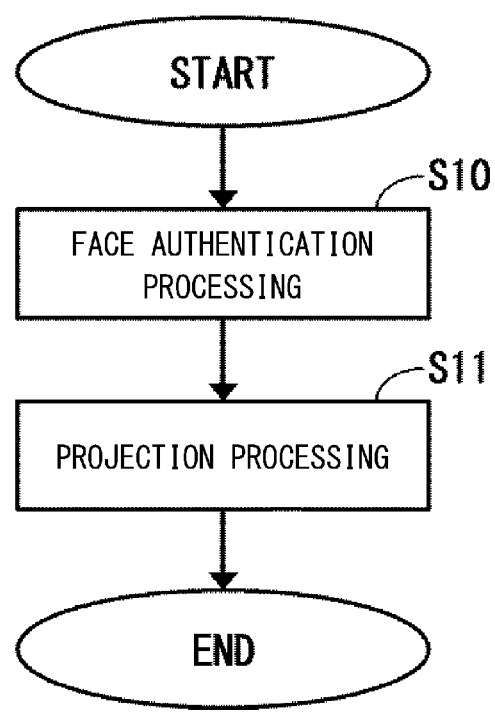
FIG. 4 is an operation flow (outline) of the second embodiment.
Figure 5:
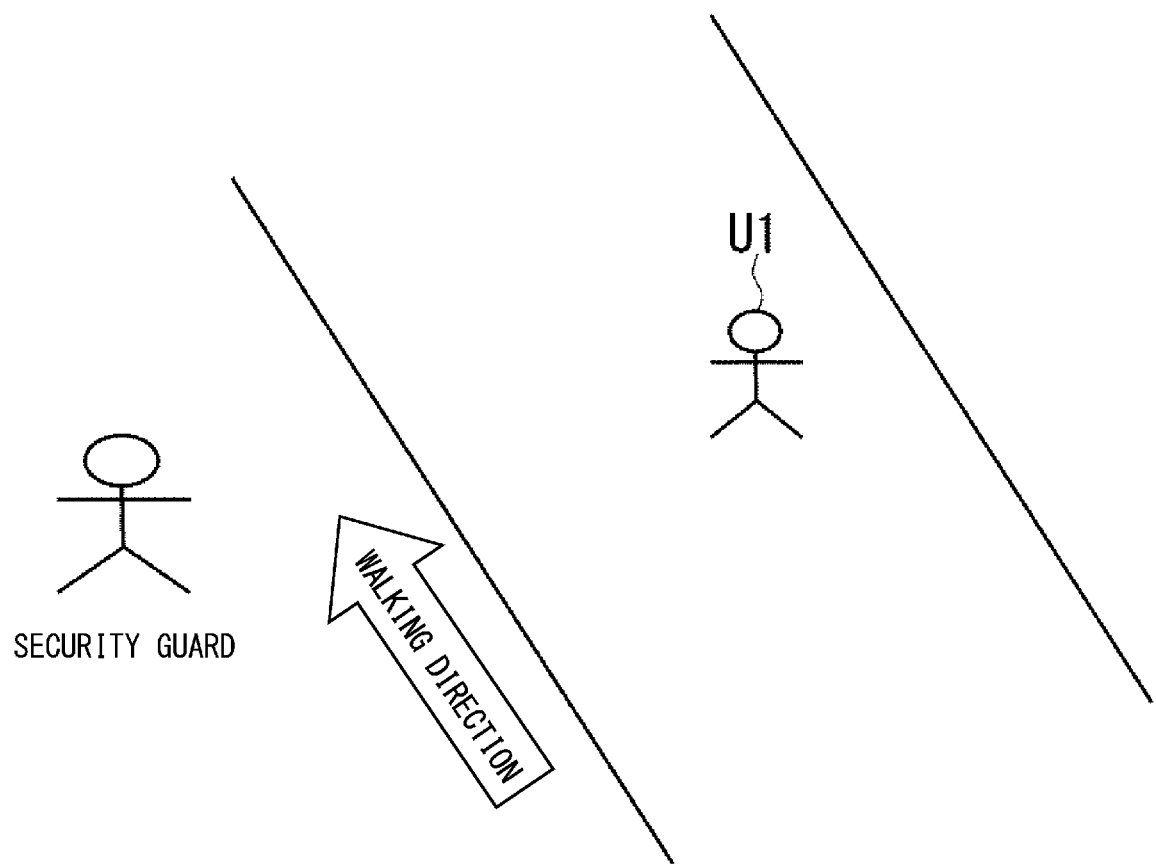
FIG. 5 is a diagram showing an example of an authentication object person U1 walking in a monitoring area.
Figure 6:
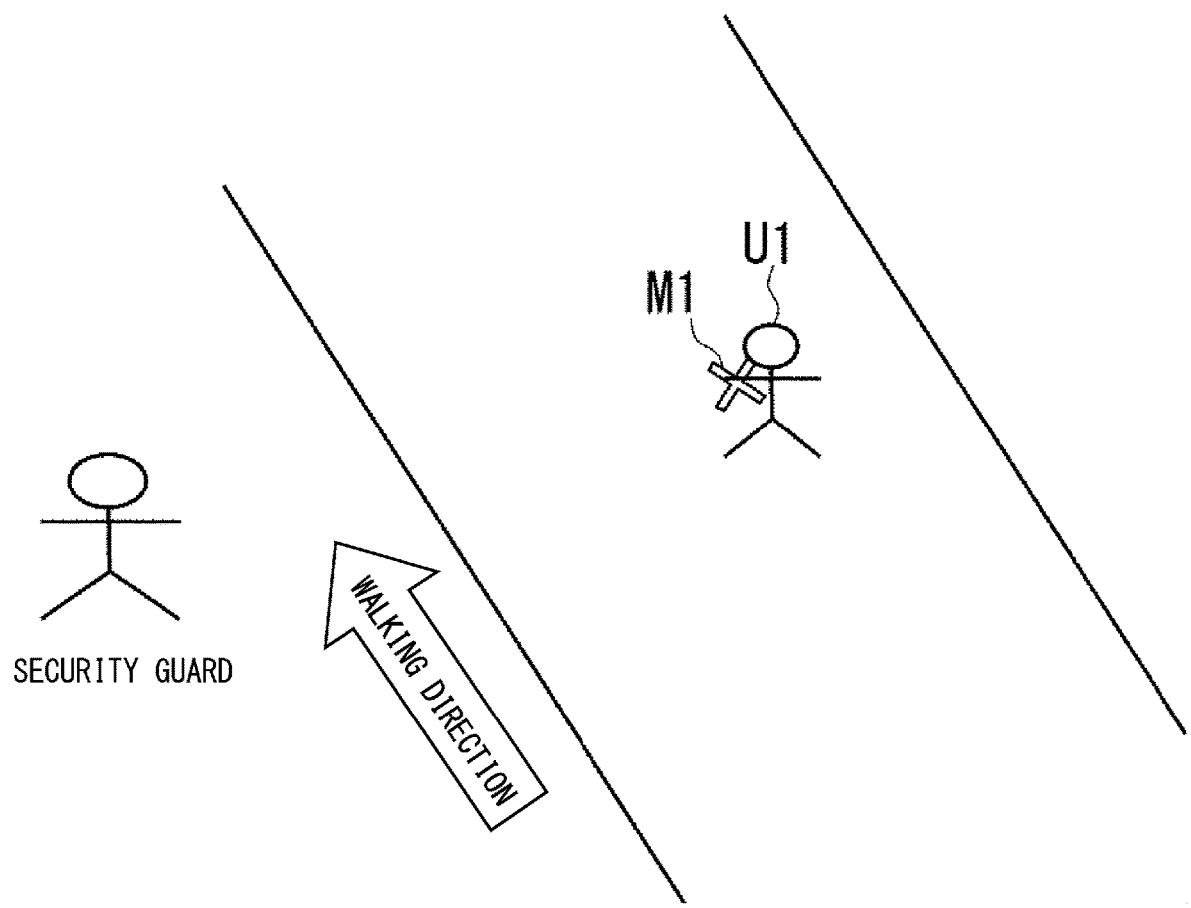
FIG. 6 is a diagram showing an example of projecting a face authentication result M1 of the authentication object person U1 walking in the monitoring area.

FIG. 4 is an operation flow (outline) of the second embodiment. FIG. 5 is a diagram showing an example of an authentication object person U1 walking in a monitoring area. FIG. 6 is a diagram showing an example of projecting a face authentication result M1 of the authentication object person U1 walking in the monitoring area.

First, the face authentication processing of the authentication object person U1 (see FIG. 5) walking in the monitoring area is executed (Step S10). Next, the projection area is specified, and projection processing for projecting the result M1 (see FIG. 6) of the face authentication on the specified projection area is executed (Step S11). It should be noted that the same processing is executed when there are a plurality of authentication object persons walking in the monitoring area.

Next, a configuration example of the authentication device 10 will be described.

Figure 7:
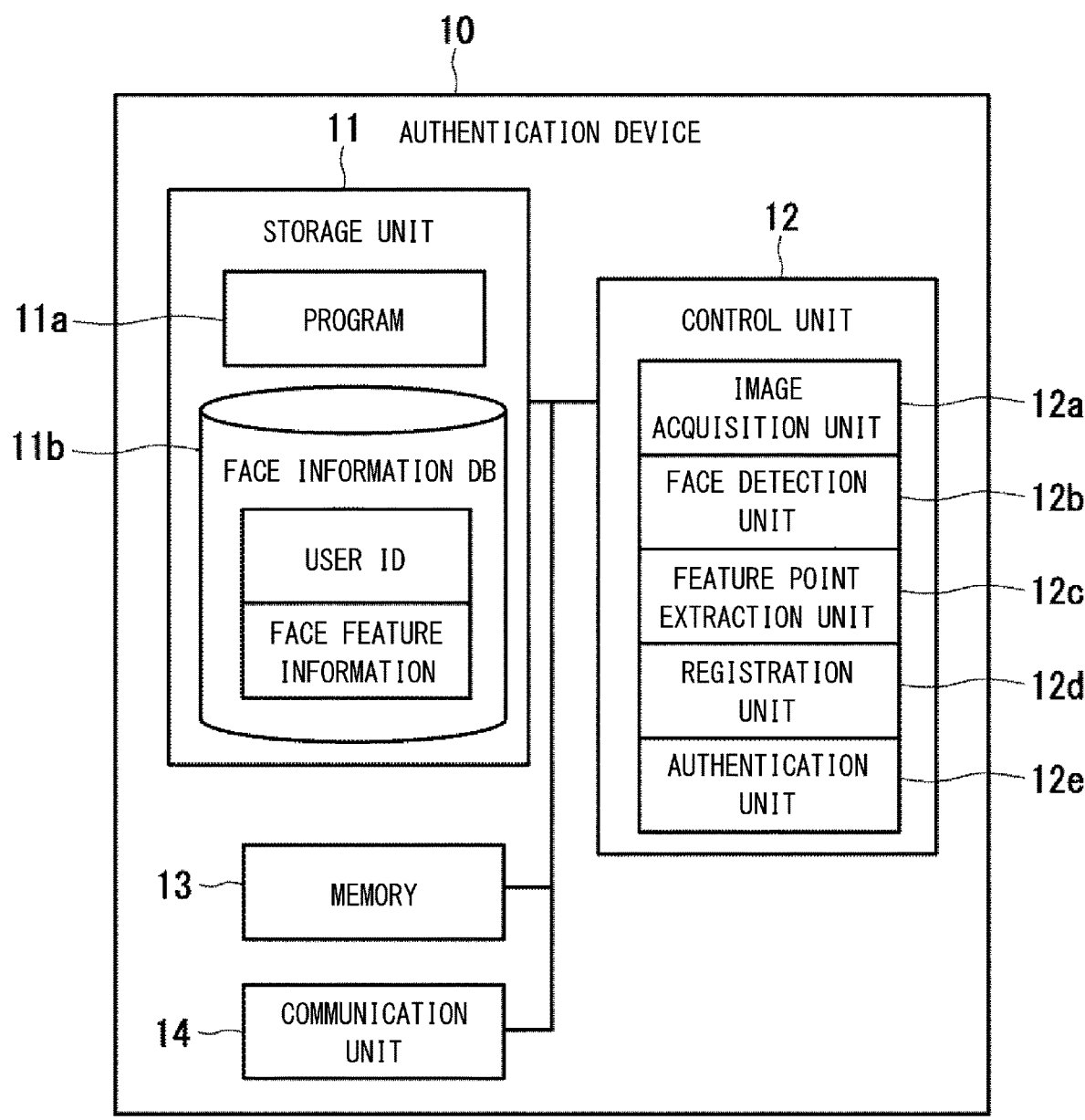
FIG. 7 is a schematic configuration diagram of the authentication device 10.

FIG. 7 is a schematic configuration diagram of the authentication device 10.

As shown in FIG. 7, the authentication device 10 includes a storage unit 11, a control unit 12, a memory 13, and a communication unit 14.

The storage unit 11 is, for example, a nonvolatile storage unit such as a hard disk drive or ROM. The storage unit 11 stores a program 11a and a face information DB 11b.

The program 11a is a program executed by the control unit 12 (processor). In a face information DB 11b. User ID (plural) and face feature information of the user (authentication object persons) are stored (registered) in association with each other. In response to a face authentication request received from the outside (For example, the authentication control device 20), the authentication device 10 verifies a face image or a face feature information included in the request against the face feature information of each authentication object person, and returns the result of the verification to the request source.

The control unit 12 includes a processor (not shown). The processor is, for example, a central processing unit (CPU). There may be one or more processors. The processor executes the program 11a read from the storage unit 11 into the memory 13 (For example, RAM) to function as an image acquisition unit 12a, a face detection unit 12b, a feature point extraction unit 12c, a registration unit 12d, and an authentication unit 12e. Some or all of these may be implemented in hardware.

The image acquisition unit 12a acquires an image including the face of a authentication object person. For example, the image acquisition unit 12a acquires an image received by the communication unit 14. The image received by the communication unit 14 is an image for registration transmitted from a user terminal (not shown) or an image for authentication (verification) transmitted from the authentication control device 20.

The face detection unit 12b detects a face area from the image acquired by the image acquisition unit 12a and outputs the detected face area to the feature point extraction unit 12c.

The feature point extraction unit 12c extracts a feature point (For example, facial features such as eyes, nose, mouth corners, etc.) from the face area detected by the face detection unit 12b.

When the image acquired by the image acquisition unit 12a is an image for registration, the feature point extraction unit 12c outputs the face feature information to the registration unit 12d. The face feature information is a set of extracted feature points. On the other hand, when the image acquired by the image acquisition unit 12a is an image for authentication, the feature point extraction unit 12c outputs the face feature information to the authentication unit 12e.

The registration unit 12d newly issues a user ID when registering face feature information. The registration unit 12d associates the issued user ID with face feature information extracted from the image for registration and registers them in the face information DB 11b.

The authentication unit 12e verifies the face feature information extracted from the face area detected from the image for authentication against the face feature information in the face information DB 11b. The authentication unit 12e returns the presence or absence of coincidence of the face feature information to the authentication control device 20. The presence or absence of the coincidence of the face feature information corresponds to the success or failure of the authentication.

The communication unit 14 is a communication device that communicates with the authentication control device 20 via the network NW.

Next, an example of the operation (face information registration processing) of the authentication device 10 will be described.

Figure 8:
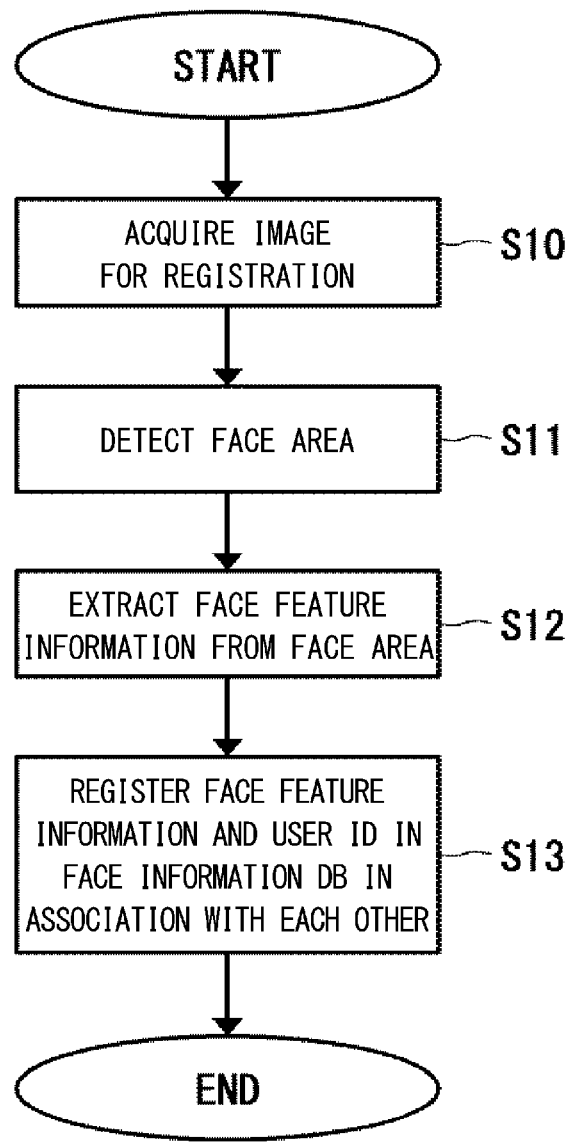
FIG. 8 is a flowchart showing an example of the operation (face information registration processing) of the authentication device 10.

FIG. 8 is a flowchart showing an example of the operation (face information registration processing) of the authentication device 10.

First, the authentication device 10 (image acquisition unit 12*a*) acquires an image (image for registration) including the face of the authentication object person included in a face information registration request (Step S10). For example, the authentication device 10 (the communication unit 14) receives the face information registration request from a user terminal (not shown) via the network NW.

Next, the authentication device 10 (the face detection unit 12*b*) detects a face area from the image for registration acquired in Step S10 (Step S11). Next, the authentication device 10 (the feature point extraction unit 12*c*) extracts feature points of the face from the face area detected in Step S11 (Step S12), and outputs the face feature information to the registration unit 12*d*. Finally, the authentication device 10 (the registration unit 12*d*) issues a user ID and registers the user ID and the face feature information in association with each other in the face information DB 11*b* (Step S13). Note that the authentication device 10 may receive the face feature information from the face authentication terminal or the like and register it in the face information DB 11*b* in association with the user ID.

Next, an example of the operation (face authentication processing) of the authentication device 10 will be described.

Figure 9:
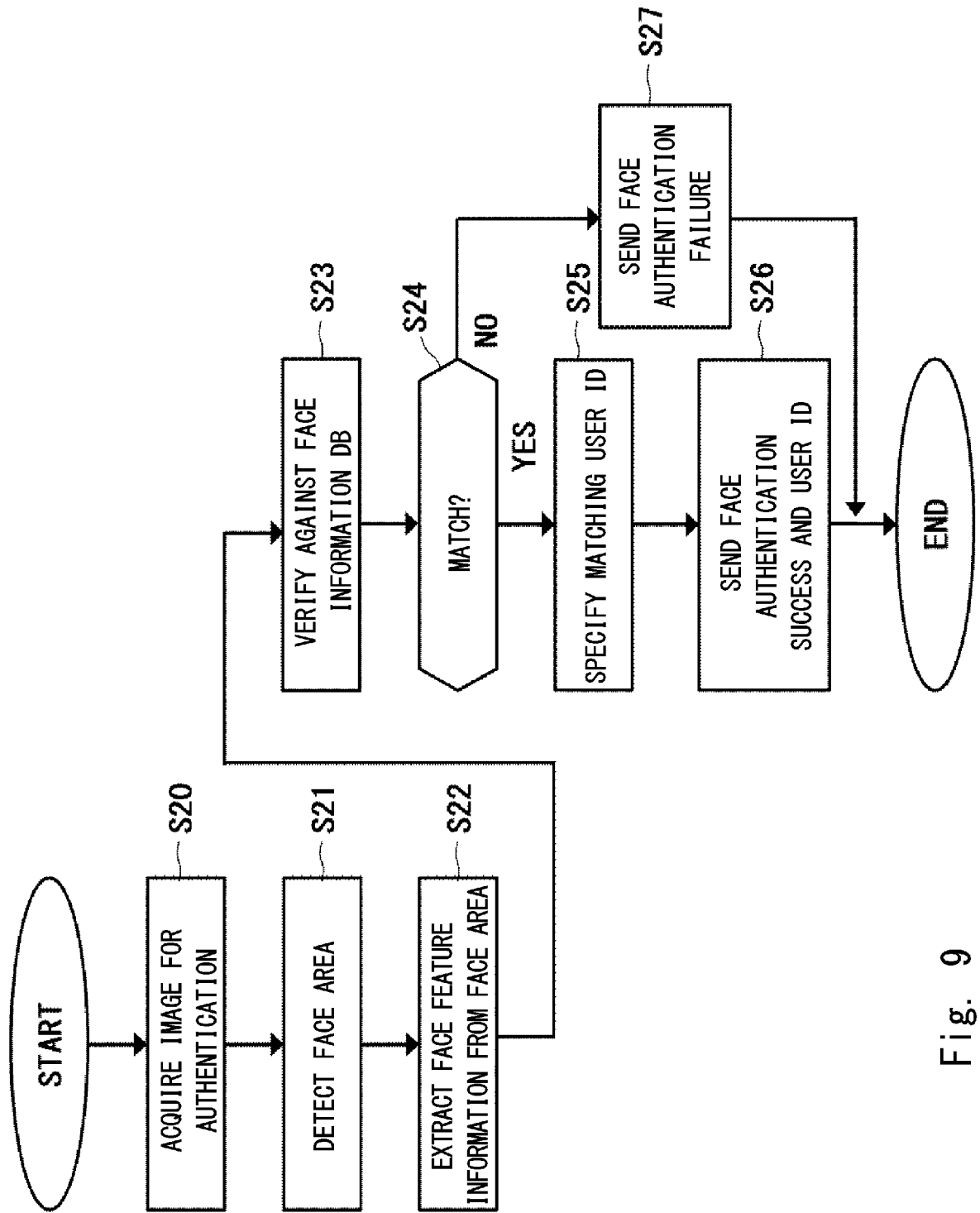
FIG. 9 is a flowchart showing an example of the operation (face authentication processing) of the authentication device 10.

FIG. 9 is a flowchart showing an example of the operation (face authentication processing) of the authentication device 10.

First, the authentication device 10 (image acquisition unit 12*a*) acquires an image (image for authentication) including the face of the authentication object person included in a face authentication request (Step S20). For example, the authentication device 10 (the communication unit 14) receives the face authentication request from the authentication control device 20 via the network NW. Next, the authentication device 10 (the face detection unit 12*b*) detects a face area from the image for authentication acquired in Step S20 (Step S21).

Next, the feature point extraction unit 12*c* extracts feature points of the face from the face area detected in Step S21 (Step S22). Alternatively, the authentication device 10 may receive the face feature information from the authentication control device 20. Next, the authentication device 10 (the authentication unit 12*e*) verifies the acquired face feature information against the face information DB 11*b* (Step S23). If the face feature information matches (Yes in Step S24), the authentication unit 12*e* specifies the user ID of the authentication object person whose face feature information matches (Step S25), and returns the fact that the face authentication is successful and the specified user ID to the authentication control device 20 (Step S26). If there is no matching face feature information (No in Step S24), the authentication unit 12*e* returns the fact that the face authentication has failed to the authentication control device 20 (Step S27).

Next, a configuration example of the authentication control device 20 will be described.

Figure 10:
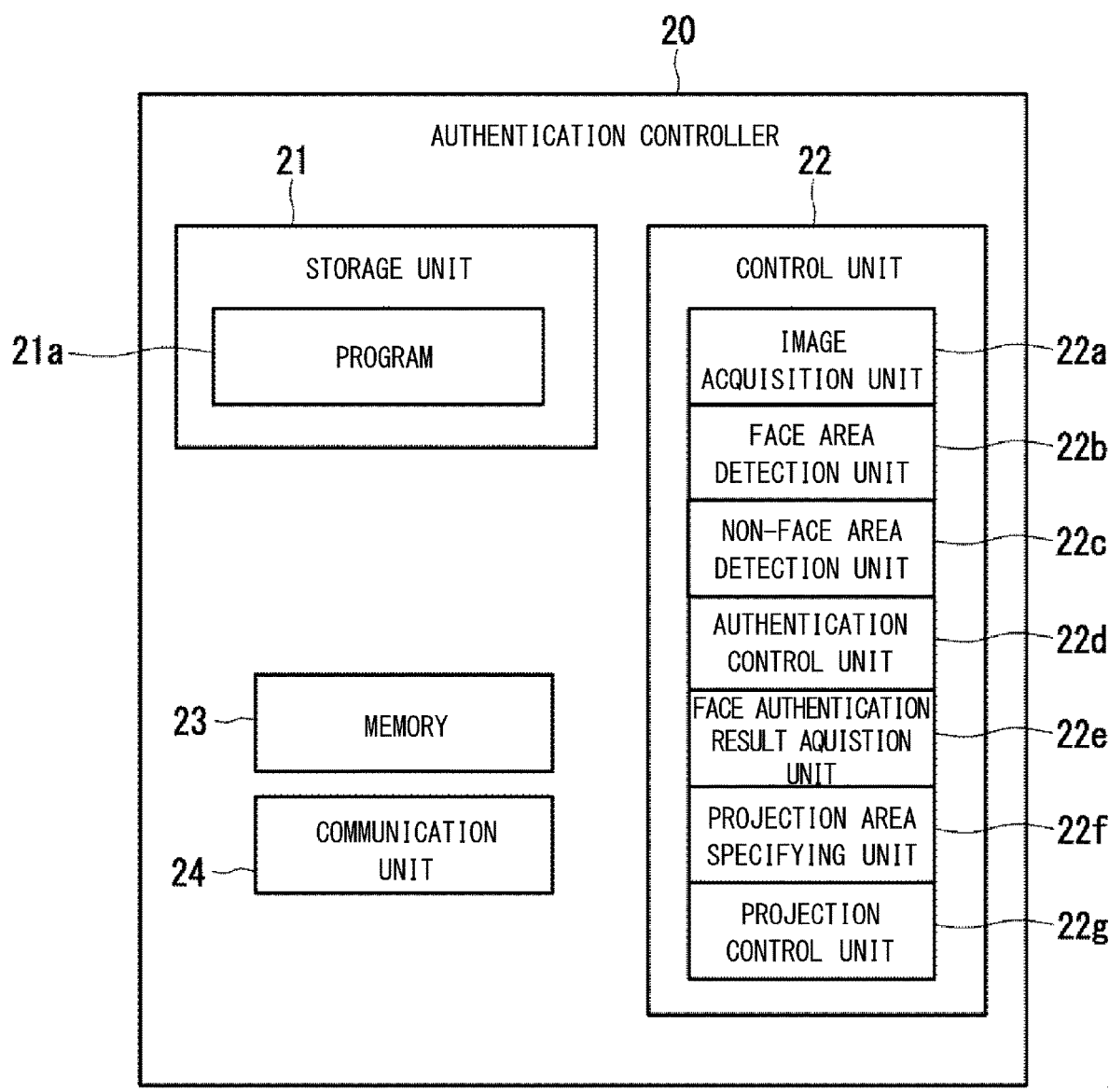
FIG. 10 is a schematic configuration diagram of the authentication control device 20.

FIG. 10 is a schematic configuration diagram of the authentication control device 20.

The authentication control device 20 is an information processing apparatus that processes an image captured by the camera 30 and issues a projection instruction to the projection device 40 in accordance with the processing contents, and is, for example, a server apparatus implemented by a computer.

As shown in FIG. 10, the authentication control device 20 includes a storage unit 21, a control unit 22, a memory 23, and a communication unit 24.

The storage unit 21 is a nonvolatile storage unit such as a hard disk drive or ROM. A program 21*a* is stored in the storage unit 21. The program 21*a* is a program executed by the control unit 22 (processor).

The control unit 22 includes a processor (not shown). The processor is, for example, a central processing unit (CPU). There may be one or more processors. The processor executes the program 21*a* read from the storage unit 21 into the memory 23 (For example, RAM) to function as an image acquisition unit 22*a*, a face area detection unit 22*b*, a non-face area detection unit 22*c*, an authentication control unit 22*d*, a face authentication result acquisition unit 22*e*, a projection area specification unit 22*f*, and a projection control unit 22*g*. Some or all of these may be implemented in hardware.

The image acquisition unit 22*a* acquires an image (hereinafter also referred to as monitoring image) including the authentication object person walking in a monitoring area, which is captured by the camera 30 that captures the monitoring area. Specifically, the communication unit 24 receives the monitoring image transmitted from the camera 30, and the image acquisition unit 22*a* acquires the monitoring image received by the communication unit 24.

The face area detection unit 22*b* executes face area detection processing for detecting the face area of the authentication object person from the monitoring image acquired by the image acquisition unit 22*a*.

The non-face area detection unit 22*c* detects a non-face area other than the face of the authentication object person from the monitoring image acquired by the image acquisition unit 22*a*.

The authentication control unit 22*d* causes the authentication device 10 for performing face authentication to perform face authentication of the authentication object person included in the monitoring image acquired by the image acquisition unit 22*a*. Specifically, the authentication control unit 22*d* transmits the monitoring image acquired by the image acquisition unit 22*a* to the authentication device 10 via the communication unit 24. In place of the monitoring image, a face area detected from the monitoring image (or a feature point extracted from the face area) may be transmitted to the authentication device 10.

The face authentication result acquisition unit 22*e* acquires the result of the face authentication executed by the authentication device 10. Specifically, the communication unit 24 receives the result of the face authentication transmitted from the authentication device 10, and the face authentication result acquisition unit 22*e* acquires the result of the face authentication received by the communication unit 24.

The projection area specification unit 22*f* specifies a projection area where the result of the face authentication is projected. For example, the projection area is an area defined by coordinates or the like in the passage. For example, the projection area specification unit 22*f* specifies an area separated by a predetermined distance from the authentication object person included in the image acquired by the image acquisition unit 22*a* as a projection area. The area separated by the predetermined distance is, for example, an area on the floor surface separated by the predetermined distance in the walking direction from the authentication object person. The predetermined distance can be determined, for example, by obtaining the walking speed of the authentication object person from the monitoring image. Further, the projection area specification unit 22*f* may specify an area including the authentication object person included in the image acquired by the image acquisition unit 22*a* as the projection area.

The projection control unit 22*g* causes the projection device 40 to project the result of the face authentication on the projection area specified by the projection area specification unit 22*f*. Specifically, the projection control unit 22*g* transmits a projection instruction to the projection device 40 via the communication unit 24.

Figure 11:
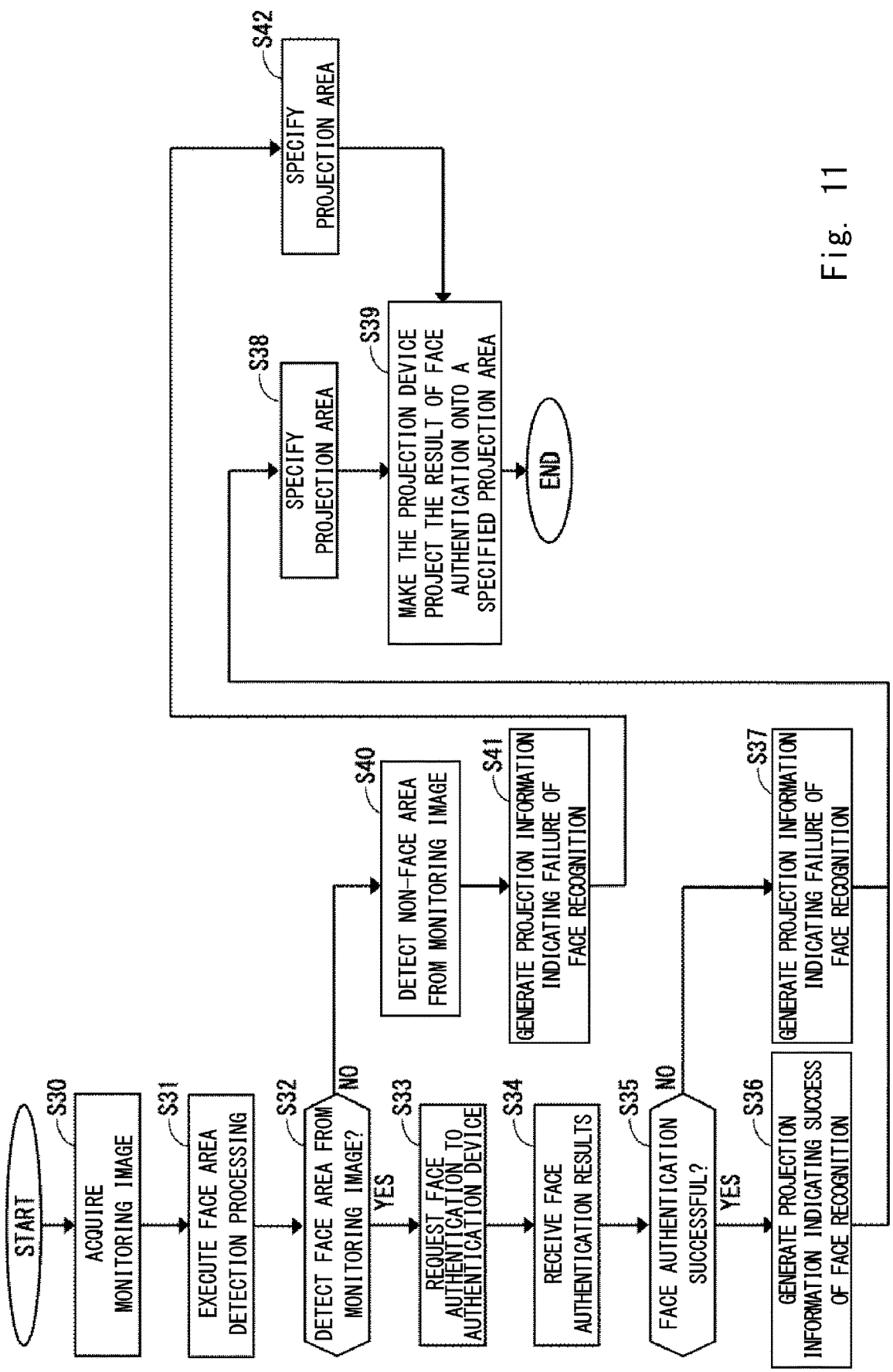
FIG. 11 is a flowchart showing an example of the operation (authentication control processing) of the authentication control device 20.

FIG. 11 is a flowchart showing an example of the operation (authentication control processing) of the authentication control device 20.

First, the authentication control device 20 (the image acquisition unit 22*a*) acquires an image including a authentication object person walking in a monitoring area photographed by the camera 30 (Step S30). For example, the communication unit 24 receives the monitoring image transmitted from the camera 30, and the image acquisition unit 22*a* acquires the monitoring image received by the communication unit 24.

Next, the authentication control device 20 (the face area detection unit 22*b*) executes face area detection processing for detecting the face area of the authentication object person from the monitoring image acquired in Step S30 (Step S31).

If the face area is detected as a result of the face area detection processing in Step S31 (Step S32: YES), the authentication control device 20 (the authentication control unit 22*d*) transmits a face authentication request requesting face authentication of the authentication object person included in the monitoring image acquired in Step S30 to the authentication device 10 via the communication unit 24 (Step S33). The face authentication request includes the monitoring image (image for authentication) acquired in Step S30.

Next, the authentication control device 20 (the communication unit 24) receives the face authentication result and the user ID transmitted from the authentication device 10, and the face authentication result acquisition unit 22*e* acquires the face authentication result and the user ID received by the communication unit 24 (Step S34).

If the face authentication is successful (Step S35: YES), that is, if the result of the face authentication acquired in Step S34 indicates that the authentication is successful, the authentication control device 20 generates projection information indicating that the face authentication is successful (Step S36). The projection information indicating that the face authentication is successful is, for example, graphic information representing a circle resembling the letter o. The projection information indicating that the face authentication is successful may be read from the storage unit 21.

On the other hand, if the face authentication fails (Step S35: NO), that is, if the result of the face authentication acquired in Step S34 indicates that the authentication has failed, the authentication control device 20 generates projection information indicating that the face authentication has failed (Step S37). The projection information indicating that the face authentication has failed is, for example, graphic information representing a cross resembling the letter x. The projection information indicating that the face authentication has failed may be read from the storage unit 21.

Next, the authentication control device 20 (the projection area specification unit 22*f*) specifies a projection area where the result of the face authentication is projected (Step S38). For example, in the monitoring image acquired in Step S30, an area separated by a predetermined distance from the face area detected in Step S32 is specified as a projection area.

Next, the authentication control device 20 (the projection control unit 22*g*) causes the projection device 40 to project the result of the face authentication on the projection area specified in Step S38 (Step S39). Specifically, the projection control unit 22*g* transmits a projection instruction for displaying the result of the face authentication to the projection device 40 via the communication unit 24.

The projection instruction includes the projection information generated in Step S36 or S37 and the projection area specified in Step S38.

On the other hand, if the face area is not detected as a result of the face area detection processing in Step S31 (Step S32: NO), the authentication control device 20 (the non-face area detection unit 22*c*) detects a non-face area other than the face of the authentication object person from the monitoring image acquired in Step S30 (Step S40).

Next, the authentication control device 20 generates projection information indicating that the face detection has failed (Step S41). The projection information indicating that the face detection has failed may be read from the storage unit 21. The projection information indicating that the face detection has failed is, for example, graphic information representing a triangle resembling the letter A.

Next, the authentication control device 20 (the projection area specification unit 22*f*) specifies a projection area where projection information indicating that face detection has failed is projected (Step S42). For example, in the monitoring image acquired in Step S30, an area separated by a predetermined distance from the non-face area detected in Step S40 is specified as a projection area.

Next, the authentication control device 20 (the projection control unit 22*g*) causes the projection device 40 to project projection information indicating that the face detection has failed on the projection area specified in Step S42 (Step S39). Specifically, the projection control unit 22*g* transmits a projection instruction for projecting projection information indicating that face detection has failed to the projection device 40 via the communication unit 24. This projection instruction includes the projection information generated in Step S41 and the projection area specified in Step S42.

Next, a configuration example of the camera 30 will be described.

The camera 30 photographs an image including an authentication object person walking in a monitoring area. The camera 30 is provided, for example, in the vicinity of a passage through which the authentication object person passes. The camera 30 photographs the face of the authentication object person, that is, the face of the authentication object person facing the advancing direction, from the front or generally from the front (In other words, photograph from an angle suitable for face recognition.). The camera 30 is a digital camera which is remotely controlled by the authentication control device 20, continuously photographs a monitoring area, and outputs the photographed image (and identification information (point ID, etc.) of the camera) to the authentication control device 20 via the network NW.

Next, a configuration example of the projection device 40 will be described.

As shown in FIG. 3, the projection device 40 is provided in the vicinity of a passage through which the authentication object person passes. The projection device 40 is, for example, a liquid crystal projector, but is not limited thereto. The projection device 40 receives a projection instruction (including projection information and a projection area) from the authentication control device 20 via the network NW. Then, the projection device 40 projects the result of the face authentication included in the projection instruction (For example, projection information generated in Step S36 or S37) on the projection area included in the projection instruction.

Next, an example of the operation of the authentication system 1 having the above configuration will be described.

Figure 12:
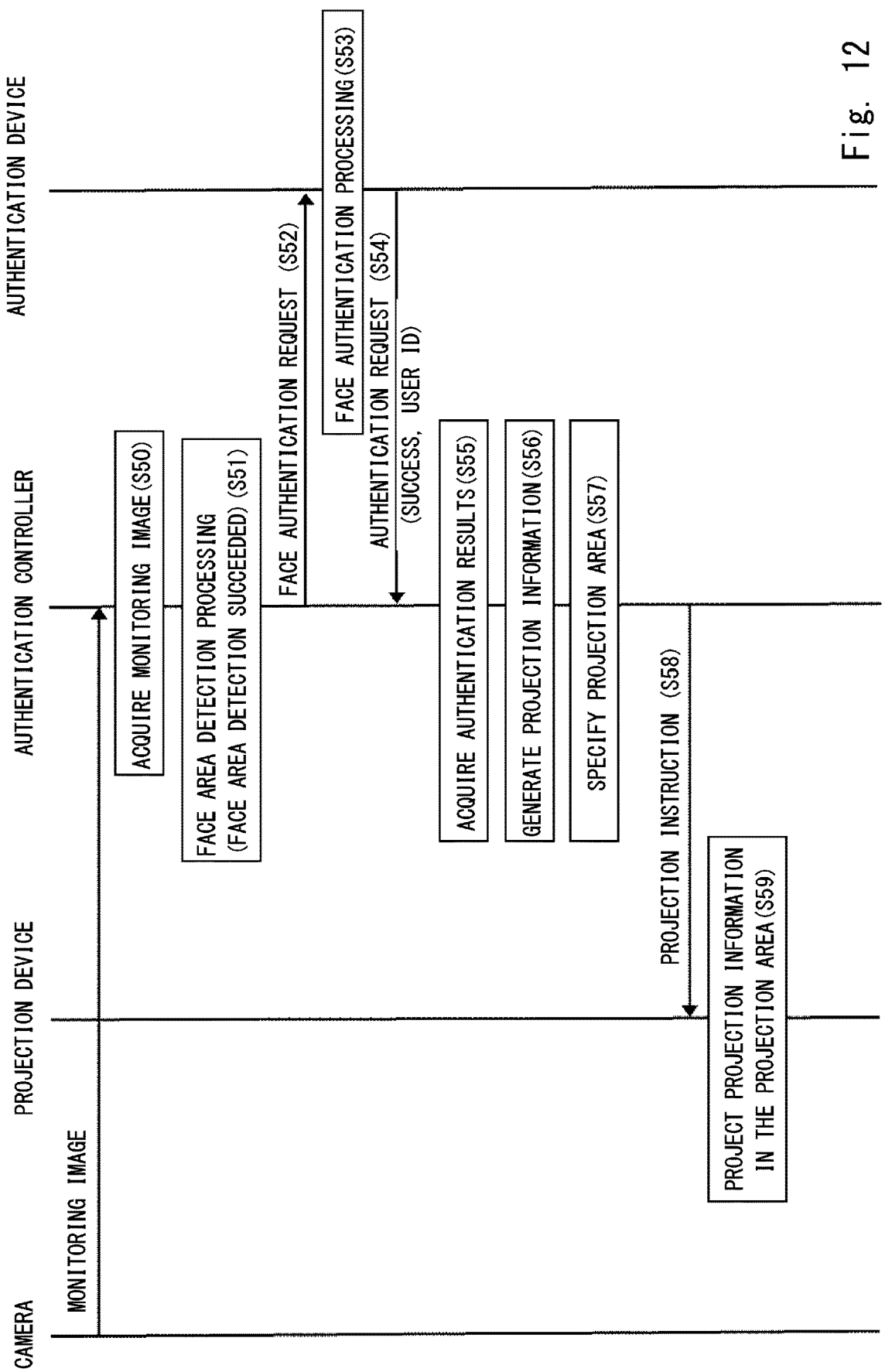
FIG. 12 is a sequence diagram of the authentication system 1.

FIG. 12 is a sequence diagram of the authentication system 1.

As shown in FIG. 12, first, the authentication control device 20 (the image acquisition unit 22*a*) acquires a monitoring image transmitted from the camera 30 and received by the communication unit 24 (Step S50). Here, it is assumed that a monitoring image including the authentication object person U1 shown in FIG. 5 is acquired.

Next, the authentication control device 20 (the face area detection unit 22*b*) executes face area detection processing for detecting the face area of the authentication object person U1 included in the monitored image acquired by the image acquisition unit 22*a* (Step S51). Here, it is assumed that the face area is successfully detected.

Next, the authentication control device 20 (the authentication control unit 22*d*) transmits a face authentication request requesting face authentication of the authentication object person U1 included in the monitoring image acquired in Step S50 to the authentication device 10 via the communication unit 24 (Step S52). The face authentication request includes the monitoring image acquired in Step S50.

Next, when the communication unit 14 receives the face authentication request transmitted in Step S52, the authentication device 10 executes a face authentication processing (see FIG. 9) (Step S53).

Next, the authentication device 10 (the authentication unit 12*e*) transmits the authentication result to the authentication control device 20 of the face authentication request transmission source via the communication unit 14 (Step S54). It is assumed here that, as the result of the authentication, the fact that the authentication was successful and the user ID of the authentication object person U1 for which the authentication was successful are transmitted to the authentication control device 20.

Next, the authentication control device 20 (the communication unit 24) receives the face authentication result and the user ID transmitted in Step S54, and the face authentication result acquisition unit 22*e* acquires the face authentication result and the user ID received by the communication unit 24 (Step S55).

Next, if the face authentication is successful (When the result of the face authentication acquired in Step S55 indicates that the authentication is successful), the authentication control device 20 generates projection information indicating that the face authentication is successful (Step S56). Here, it is assumed that the graphic information representing a circle resembling the letter o is generated as projection information indicating that the face authentication is successful.

Figure 13:
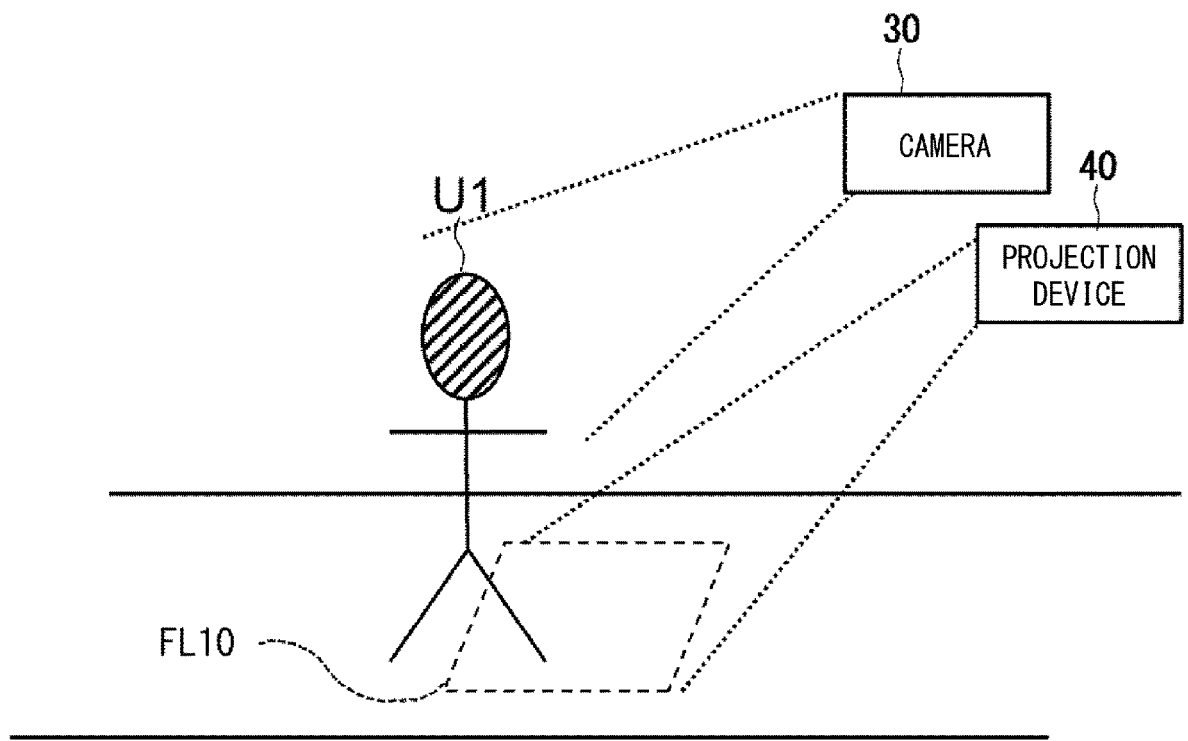
FIG. 13 shows an example of a projection area.

Next, the authentication control device 20 (the projection area specification unit 22*f*) specifies a projection area where the result of the face authentication is projected (Step S57). Here, as shown in FIG. 13, it is assumed that the area FL10 in the monitoring image acquired in Step S50 is specified as a projection area. The area FL10 is an area on the floor surface separated by a predetermined distance in the walking direction from the face area (authentication object person U1) detected in Step S51. FIG. 13 shows an example of a projection area.

Next, the authentication control device 20 (the projection control unit 22*g*) transmits a projection instruction for displaying the result of the face authentication to the projection device 40 via the communication unit 24 (Step S58). This projection instruction includes the projection information generated in Step S56 and the projection area specified in Step S57.

Figure 14:
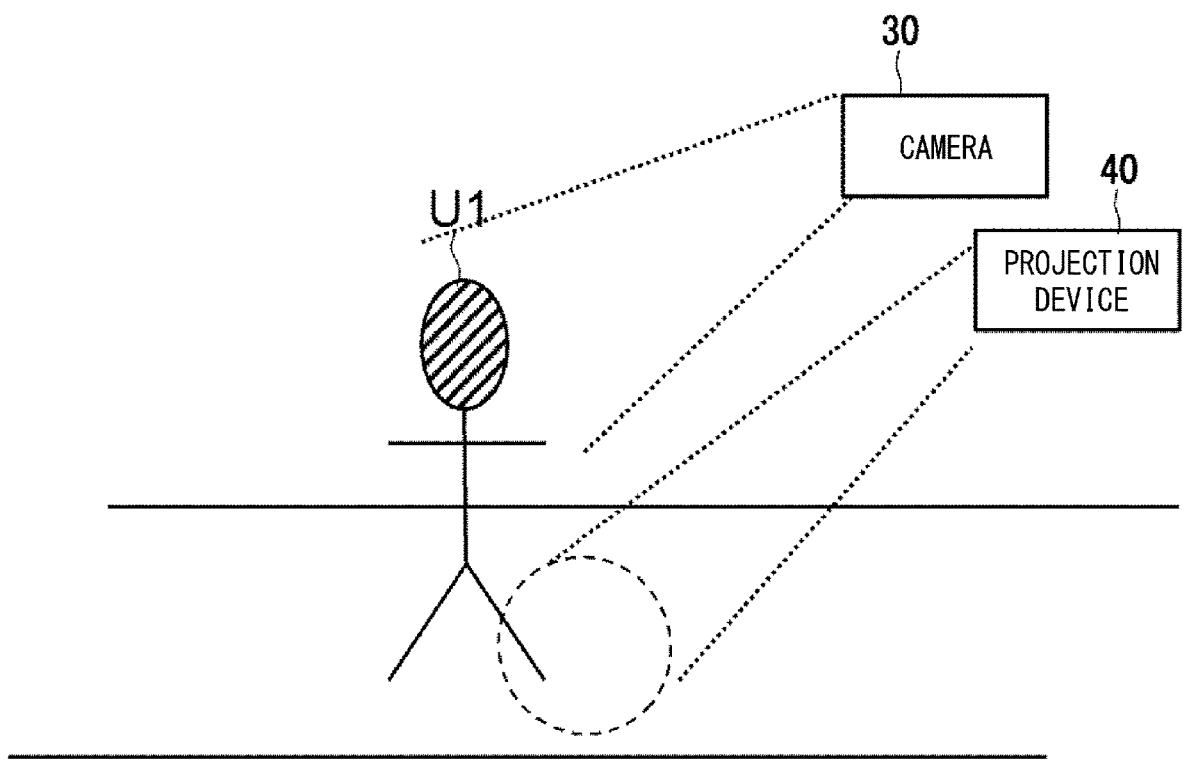
FIG. 14 is an example of a result of face authentication projected on the projection area.

Next, the projection device 40 projects the projection information included in the projection instruction transmitted in Step S58 and received by the communication unit (not shown) of the projection device 40 on the projection area included in the projection instruction (Step S59). For example, projection is performed as shown in FIG. 14. FIG. 14 is an example of a result of face authentication projected on the projection area.

On the other hand, if the face authentication fails (When the result of the face authentication acquired in Step S55 indicates that the authentication has failed.), projection information indicating that the face authentication fails is generated (Step S56). Here, it is assumed that graphic information representing a cross resembling the letter x is generated as projection information indicating that face authentication has failed.

Next, the authentication control device 20 (the projection area specification unit 22*f*) specifies a projection area where the result of the face authentication is projected (Step S57). Here, as shown in FIG. 13, it is assumed that the area FL10 in the monitoring image acquired in Step S50 is specified as a projection area. The area FL10 is an area on the floor surface separated by a predetermined distance in the walking direction from the face area (authentication object person U1) detected in Step S51.

Next, the authentication control device 20 (the projection control unit 22*g*) transmits a projection instruction for displaying the result of the face authentication to the projection device 40 via the communication unit 24 (Step S58). This projection instruction includes the projection information generated in Step S56 and the projection area specified in Step S57.

Figure 15:
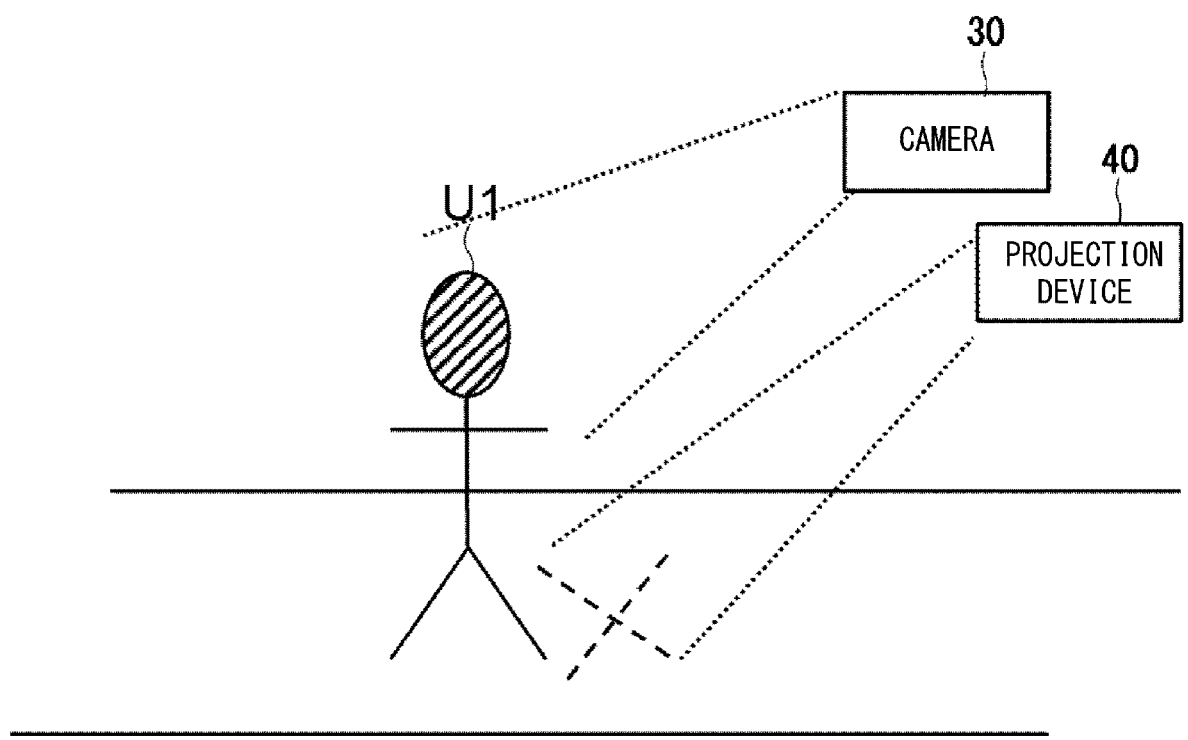
FIG. 15 is an example of a result of face authentication projected on the projection area.

Next, the projection device 40 projects the projection information included in the projection instruction transmitted in Step S58 and received by the communication unit (not shown) of the projection device 40 on the projection area included in the projection instruction (Step S59). For example, projection is performed as shown in FIG. 15. FIG. 15 is an example of a result of face authentication projected on the projection area.

Next, an example of an operation when face detection fails will be described.

Figure 16:
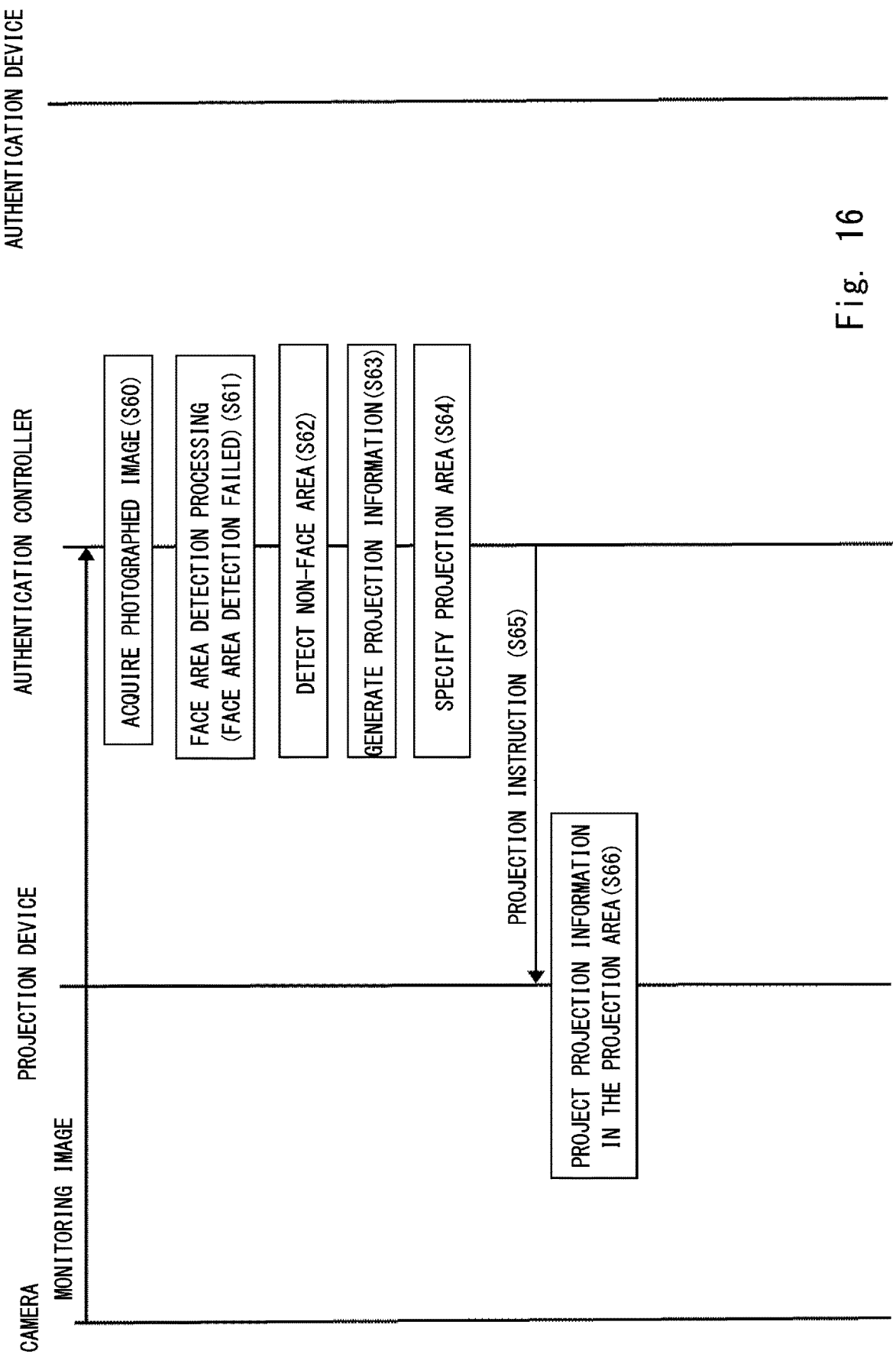
FIG. 16 is a sequence diagram of the authentication system 1.

FIG. 16 is a sequence diagram of the authentication system 1.

As shown in FIG. 16, first, the authentication control device 20 (the image acquisition unit 22*a*) acquires a monitoring image transmitted from the camera 30 and received by the communication unit 24 (Step S60). Here, it is assumed that a monitoring image including the authentication object person U1 shown in FIG. 5 is acquired.

Next, the authentication control device 20 (the face area detection unit 22b) executes face area detection processing for detecting the face area of the authentication object person U1 from the monitoring image acquired by the image acquisition unit 22a (Step S61). Here, it is assumed that the detection of the face area has failed.

Next, the authentication control device 20 (the non-face area detection unit 22c) detects a non-face area other than the face of the authentication object person from the monitoring image acquired in Step S60 (Step S62).

Next, the authentication control device 20 generates projection information indicating that the face detection has failed (Step S63). Here, it is assumed that graphic information representing a triangle resembling the letter A is generated as projection information indicating that the face detection has failed.

Next, the authentication control device 20 (the projection area specification unit 22f) specifies a projection area where projection information indicating that face detection has failed is projected (Step S64). Here, as shown in FIG. 13, it is assumed that the area FL10 in the monitoring image acquired in Step S60 is specified as a projection area. The area FL10 is an area on the floor surface separated by a predetermined distance in the walking direction from the non-face area (authentication object person U1) detected in Step S62.

Next, the authentication control device 20 (the projection control unit 22g) transmits a projection instruction for displaying projection information indicating that the face detection has failed to the projection device 40 via the communication unit 24 (Step S65). This projection instruction includes the projection information generated in Step S63 and the projection area specified in Step S64.

Next, the projection device 40 projects the projection information included in the projection instruction transmitted in Step S65 and received by the communication unit (not shown) of the projection device 40 on the projection area included in the projection instruction (Step S66).

As described above, according to the second embodiment, the authentication result can be projected (alarmed) in association with the authentication object person (See FIG. 14 and FIG. 15). This reduces, for example, the monitoring burden of a security guard.

Embodiment 3

Hereinafter, another operation example of the authentication system 1 will be described in detail as a third embodiment of the present invention.

First, an outline of the third embodiment will be described.

Figure 17:
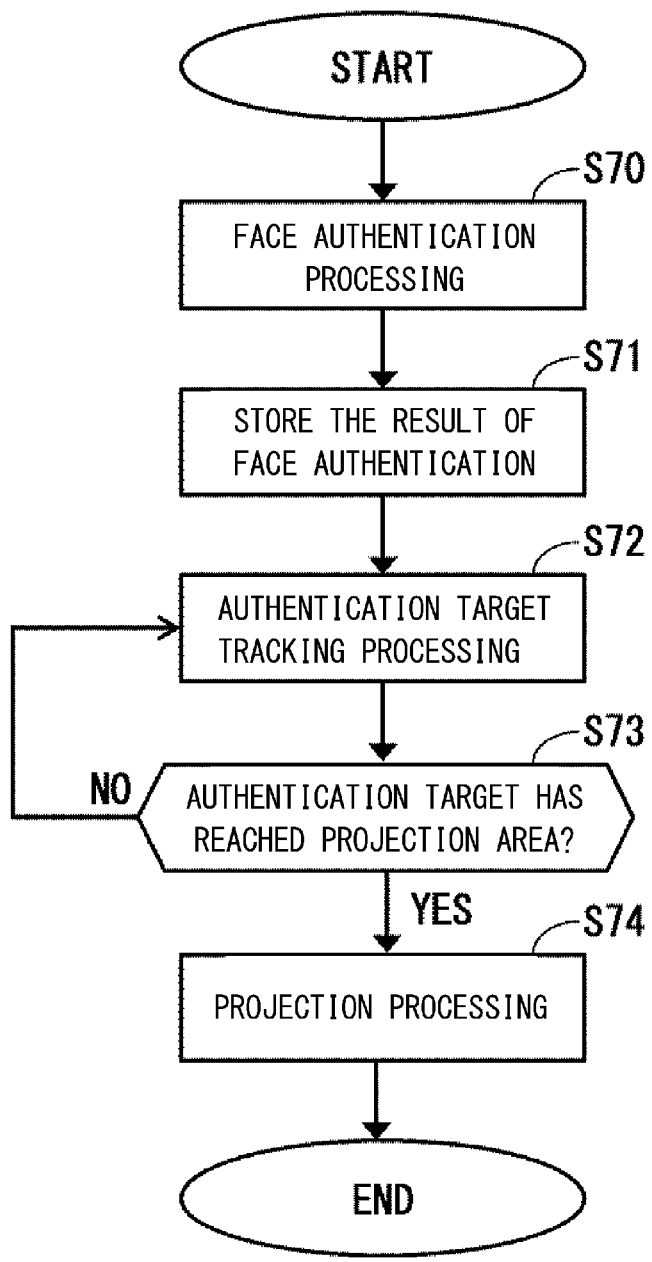
FIG. 17 is an operation flow (outline) of Embodiment 3.
Figure 18:
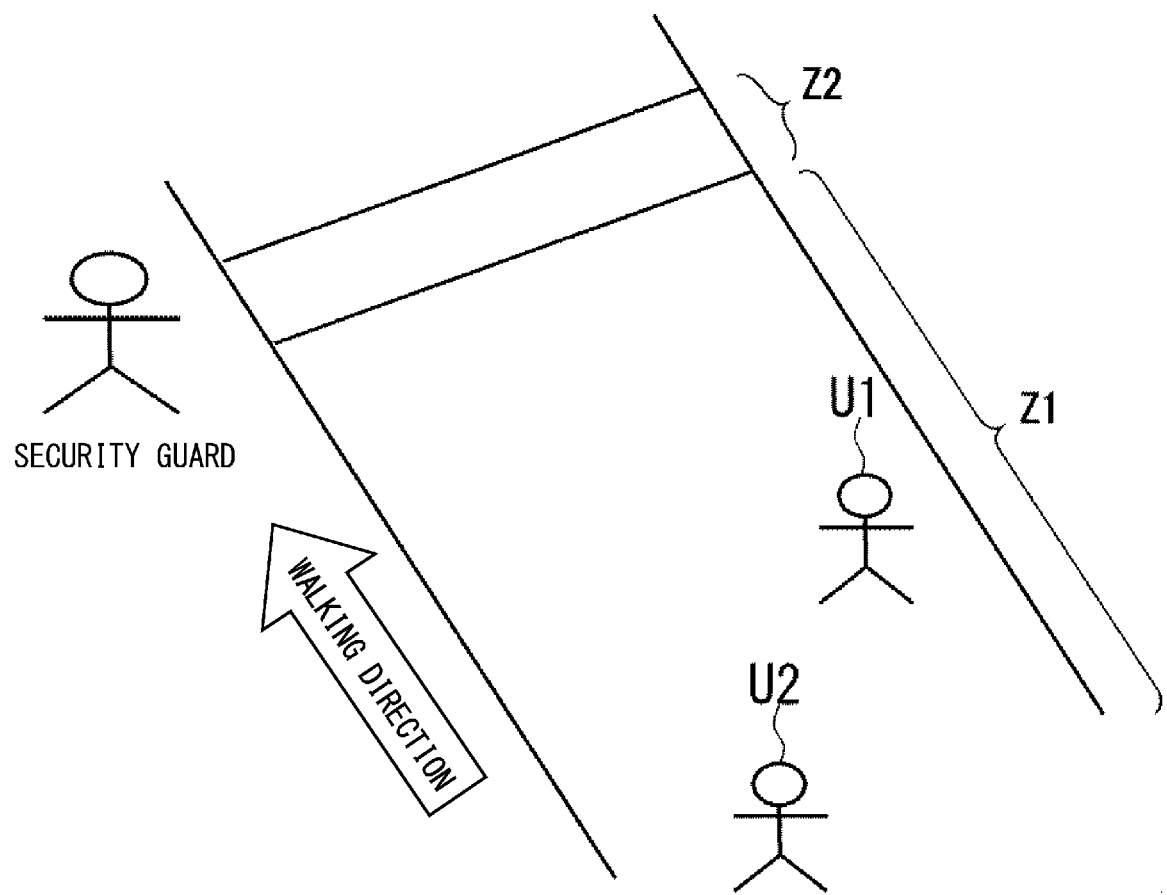
FIG. 18 is a diagram showing an example of the authentication object persons U1 and U2 walking in the monitoring area (authentication zone Z1)
Figure 19:
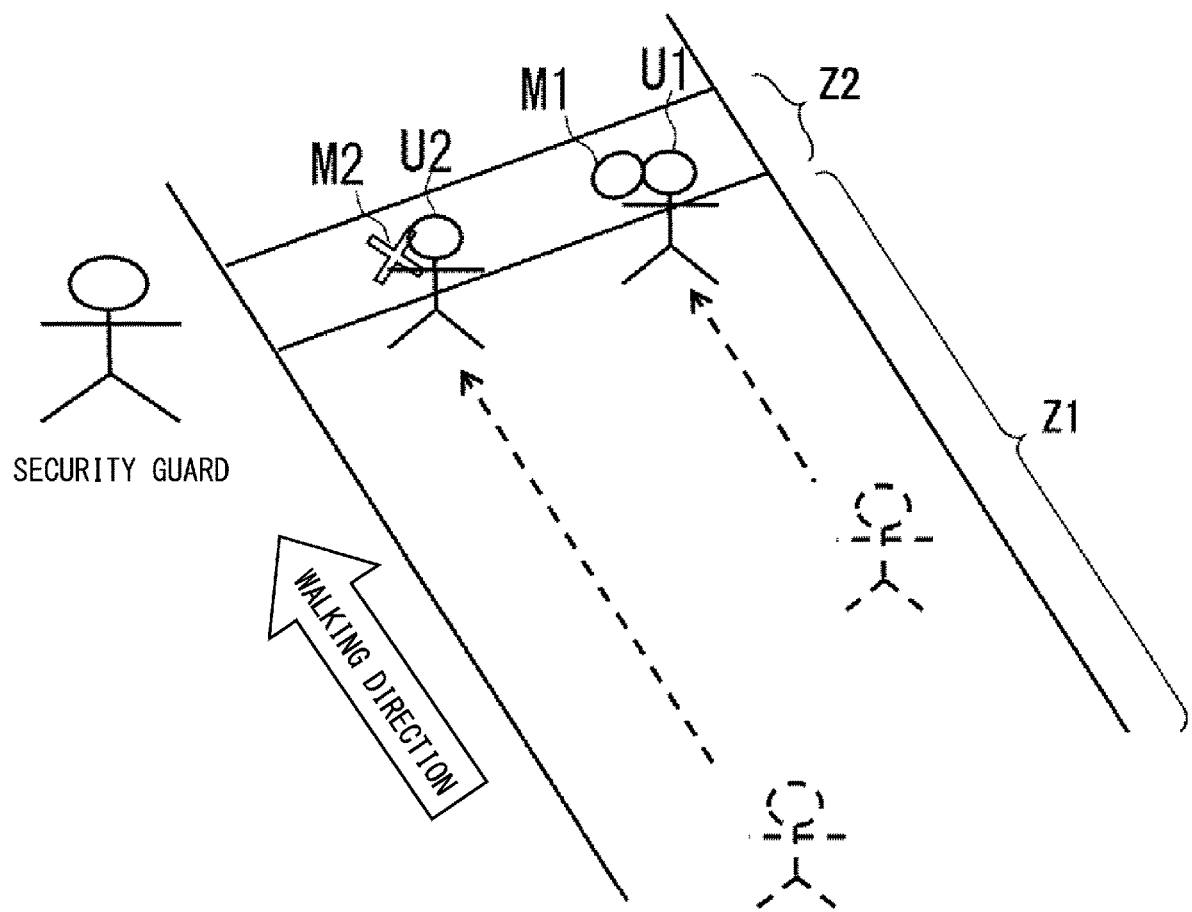
FIG. 19 is a diagram showing an example of projecting the face authentication results M1 and M2 of the authentication object persons U1 and U2 walking in the monitoring area (authentication zone Z1)

FIG. 17 is an operation flow (outline) of Embodiment 3. FIG. 18 is a diagram showing an example of the authentication object persons U1 and U2 walking in the monitoring area (authentication zone Z1). FIG. 19 is a diagram showing an example of projecting the face authentication results M1 and M2 of the authentication object persons U1 and U2 walking in the monitoring area (authentication zone Z1).

As shown in FIG. 18, in Embodiment 3, an authentication zone Z1 for performing face authentication of the authentication object persons U1 and U2 and a projection zone Z2 for projecting the authentication result are separated.

First, the face authentication processing of the authentication object persons U1 and U2 (see FIG. 18) is executed in the authentication zone Z1 (Step S70).

Next, the result of the face authentication is stored (Step S71).

Next, a tracking processing for tracking the authentication object person is executed (Step S72).

Next, when the authentication object person reaches the projection zone Z2 (Step S73: YES), the projection area is specified and projection processing is executed (Step S74). The projection processing is a processing of projecting the results M1 and M2 (see FIG. 19) of the face authentication into the projection zone Z2 (the specified projection area). The specification of the projection area may be omitted.

On the other hand, when the authentication object person has not reached the projection zone Z2 (Step S73: NO), the processing of Step S72 is repeatedly executed (Step S73: NO).

Details will be described below. First, the face authentication processing (S70) will be described in detail.

Figure 20:
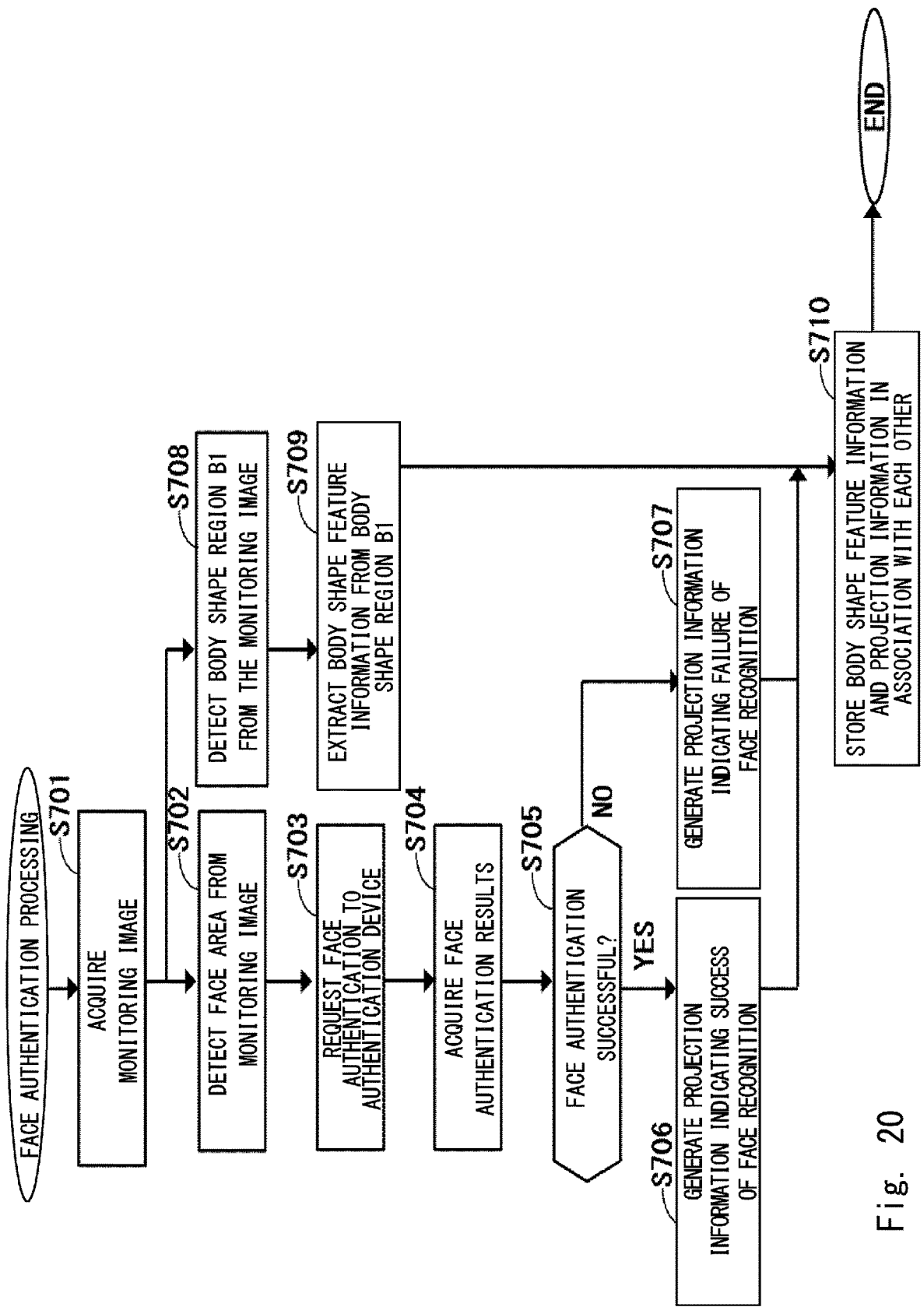
FIG. 20 is a flowchart of an example of the face authentication processing (S70)

FIG. 20 is a flowchart of an example of the face authentication processing (S70). Hereinafter, a case where only one person is subject to authentication will be described as an example, but the same applies to a case where a plurality of persons are subject to authentication.

First, the authentication control device 20 (the image acquisition unit 22a) acquires a monitoring image including an authentication object person walking in a monitoring area (authentication zone Z1) photographed by the camera 30 (Step S701). For example, the communication unit 24 receives a monitoring image transmitted from the camera 30, and the image acquisition unit 22a acquires the monitoring image received by the communication unit 24. Here, it is assumed that a monitoring image including the authentication object person U1 shown in FIG. 18 is acquired.

Next, the authentication control device 20 (the face area detection unit 22b) executes face area detection processing for detecting the face area of the authentication object person U1 from the monitoring image acquired in Step S701 (Step S702).

Next, the authentication control device 20 (the authentication control unit 22d) transmits a face authentication request requesting face authentication of the authentication object person U1 included in the monitoring image acquired in Step S701 to the authentication device 10 via the communication unit 24 (Step S703). The face authentication request includes the monitoring image (image for authentication) acquired in Step S701.

Next, the authentication control device 20 (the communication unit 24) receives the face authentication result and the user ID transmitted from the authentication device 10, and the face authentication result acquisition unit 22e acquires the face authentication result and the user ID received by the communication unit 24 (Step S704).

If the face authentication is successful (Step S705: YES), that is, if the result of the face authentication acquired in Step S704 indicates that the authentication is successful, the authentication control device 20 generates projection information (for example, graphic information representing a circle resembling the letter o) indicating that the face authentication is successful (Step S706).

On the other hand, if the face authentication fails (Step S705: NO), that is, if the result of the face authentication acquired in Step S704 indicates that the authentication has failed, the authentication control device 20 generates projection information (for example, graphic information representing a cross resembling the letter x) indicating that the face authentication has failed (Step S707).

Here, it is assumed that projection information (for example, graphic information representing a circle resembling the letter o) indicating that the face authentication is successful is generated.

The processes of steps S708 and S709 are executed in parallel with the processes of steps 5702 to 5707.

First, the authentication control device 20 (the non-face area detection unit 22c) detects a non-face area (Hereinafter referred to as body shape area B1) other than the face of the authentication object person from the monitoring image acquired in Step S701 (Step S708).

Next, the authentication control device 20 extracts the body shape feature information from the body shape area B1 detected in Step S708 (Step S709). Here, it is assumed that the body shape feature information of the authentication object person U1 is extracted.

Next, the authentication control device 20 (registration unit) stores (registers) in the storage unit 21 the projection information generated in Step S706 (or Step S707) in association with the body shape feature information extracted in Step S709 (Step S710). This Step S710 corresponds to "store the result of face authentication" of Step S71 in FIG. 17.

It is assumed here that the projection information (For example, graphic information representing a circle resembling the letter o) generated in Step S706 (or Step S707) and the body shape feature information of the authentication object person U1 extracted in Step S79 are stored in association with each other.

Next, the details of the authentication object person tracking processing (S72) will be described. The authentication object person tracking processing (S72) is an example of the authentication object person tracking means of the present invention.

Figure 21:
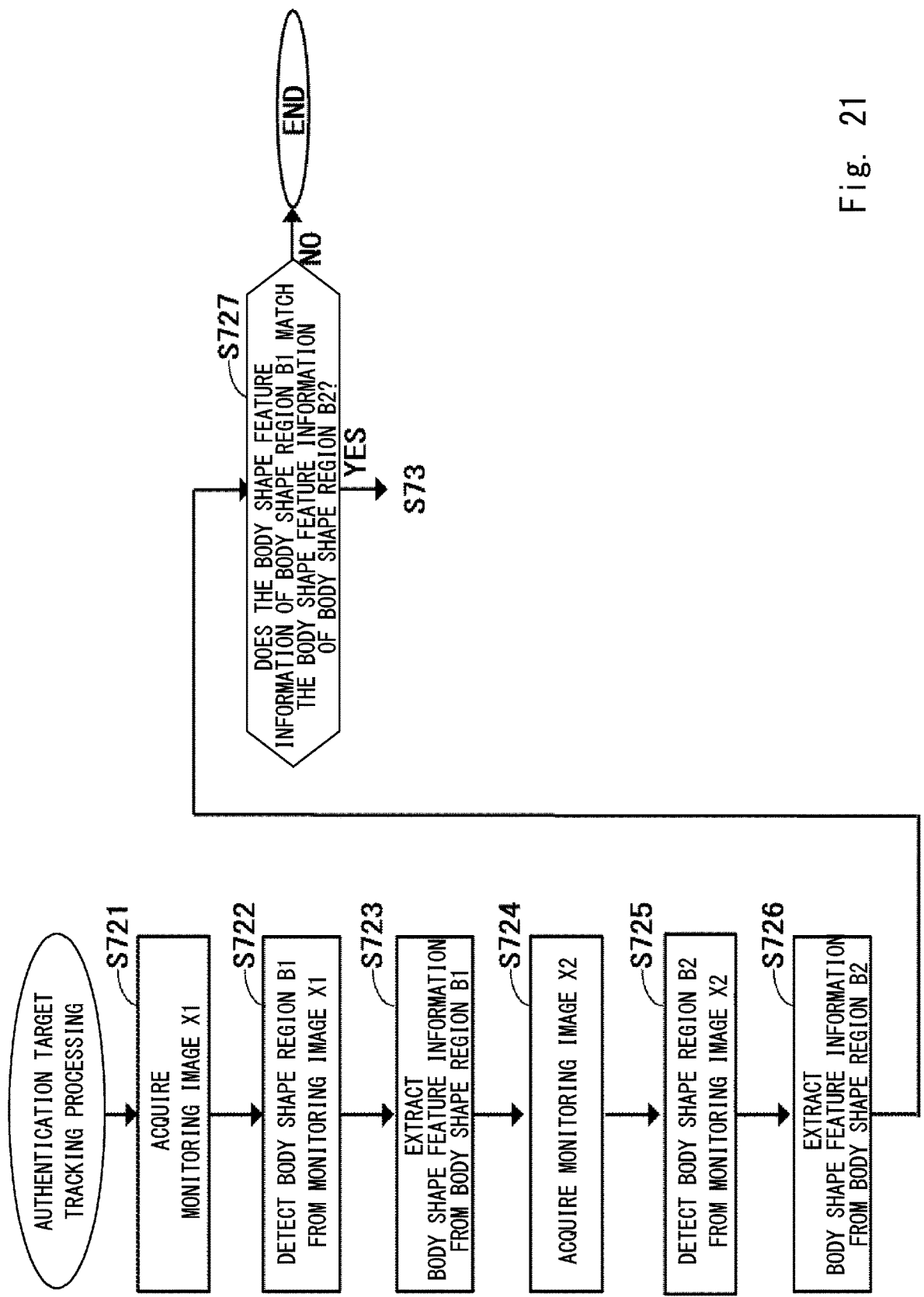
FIG. 21 is a flowchart of an example of the authentication object person tracking processing (S72)

FIG. 21 is a flowchart of an example of the authentication object person tracking processing (S72).

First, the authentication control device 20 (the image acquisition unit 22a) acquires a monitoring image (Hereinafter referred to as a monitoring image X1) including an authentication object person walking in a monitoring area (authentication zone Z1) photographed by the camera 30 (Step S721). For example, the communication unit 24 receives a monitoring image X1 transmitted from the camera 30, and the image acquisition unit 22a acquires the monitoring image X1 received by the communication unit 24. Here, it is assumed that a monitoring image including the authentication object person U1 shown in FIG. 18 is acquired.

Next, the authentication control device 20 (the non-face area detection unit 22c) detects a non-face area (Hereinafter referred to as body shape area B1) other than the face of the authentication object person U1 from the monitoring image X1 acquired in Step S721 (Step S722).

Next, the authentication control device 20 extracts the body shape feature information from the body shape area B1 detected in Step S722 (Step S723).

Next, the authentication control device 20 (the image acquisition unit 22a) acquires an image (Hereinafter referred to as monitor image X2) including the authentication object person U1 walking in the monitoring area (authentication zone Z1) photographed by the camera 30 (Step S724). For example, the communication unit 24 receives a monitoring image X2 transmitted from the camera 30, and the image acquisition unit 22a acquires the monitoring image X2 received by the communication unit 24.

Next, the authentication control device 20 (the non-face area detection unit 22c) detects a non-face area (Hereinafter referred to as body shape area B2) other than the face of the authentication object person U1 from the monitoring image X2 acquired in Step 5724 (Step S725).

Next, the authentication control device 20 extracts the body shape feature information from the body shape area B2 detected in Step S725 (Step S726).

Then, the body shape feature information extracted in Step S723 is verified against shape feature information extracted in Step S726, and if the verification results match (Step S727: YES), the process proceeds to Step S73. On the other hand, if the verification results do not match (Step S727: NO), the process ends.

When the authentication object person tracked as described above reaches the projection zone Z2 (Step S73: YES), projection processing (Step S74) is executed (see FIG. 17).

Next, the details of the projection processing (Step S74) will be described.

Figure 22:
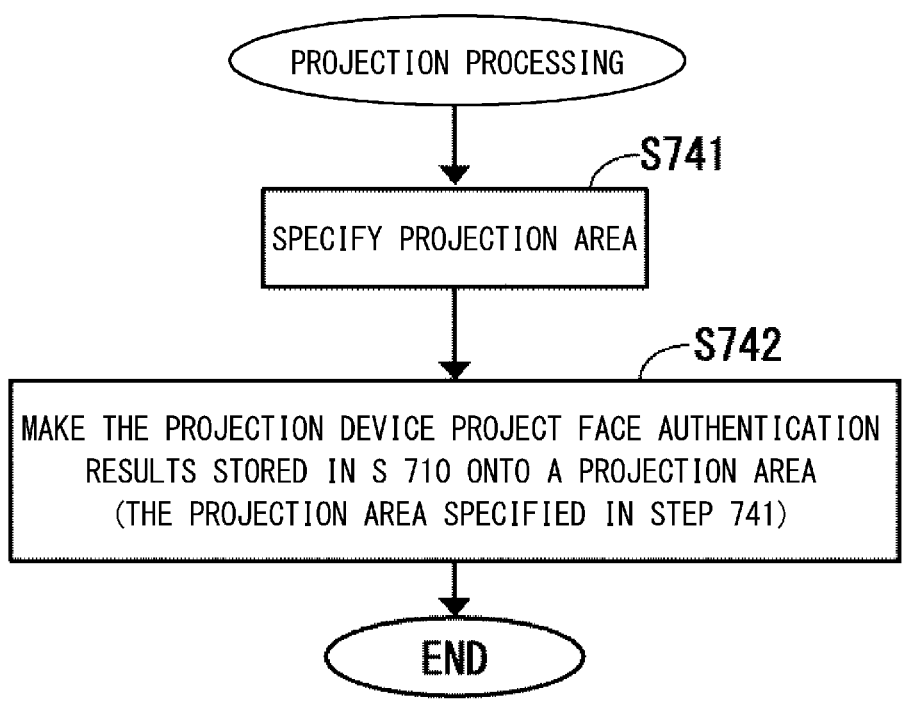
FIG. 22 is a flowchart of an example of the projection processing (Step S74)

FIG. 22 is a flowchart of an example of the projection processing (Step S74).

First, the authentication control device 20 (the projection area specification unit 22f) specifies a projection area where the result of the face authentication is projected (Step S741). Here, it is assumed that an area in the monitoring image X2 acquired in Step S724 is specified as a projection area. The area as the projection area is an area on the floor surface separated by a predetermined distance in the walking direction from the body shape area B2 (authentication object person U1) which is the non-face area detected in Step S725.

Next, the authentication control device 20 (the projection control unit 22g) cause the projection device 40 to project the result of the face authentication stored in Step S710 on the projection zone Z2 (the projection area specified in Step S741) (Step S742). Specifically, the projection control unit 22g transmits the projection instruction for displaying the result of the face authentication stored in Step S710 to the projection device 40 via the communication unit 24. This projection instruction includes the projection information stored in Step S710 and the projection area specified in Step S741.

Next, when the communication unit (not shown) of the projection device 40 receives the projection instruction transmitted in Step S742, the projection device 40 projects the projection information included in the received projection instruction on the projection area included in the projection instruction. For example, projection is performed as shown in FIG. 19.

As described above, according to Embodiment 3, the authentication result can be projected (alarmed) in association with the authentication object person (see FIG. 19).

According to the third embodiment, the result of the face authentication is not projected in the authentication zone Z1 but displayed in the projection zone Z2. Therefore, only monitoring the projection zone Z2 is required, and the monitoring load of a security guard is reduced.

Further, according to Embodiment 3, since the result of the face authentication is stored in Step S710, the result of the face authentication (the result stored in Step S710) can be projected correctly in the projection zone Z2 even if the situation becomes unsuitable for the face authentication due to the fact that the person to be authenticated faces down or the like in the subsequent tracking processing of the person to be authenticated (Step S72).

Further, according to Embodiment 3, since the result of the face authentication is stored in Step S710 and the face authentication is not executed thereafter, the authentication cost can be suppressed.

Embodiment 4

Hereinafter, another operation example of the authentication system 1 will be described in detail as a fourth embodiment of the present invention.

First, an outline of the fourth embodiment will be described.

Figure 23:
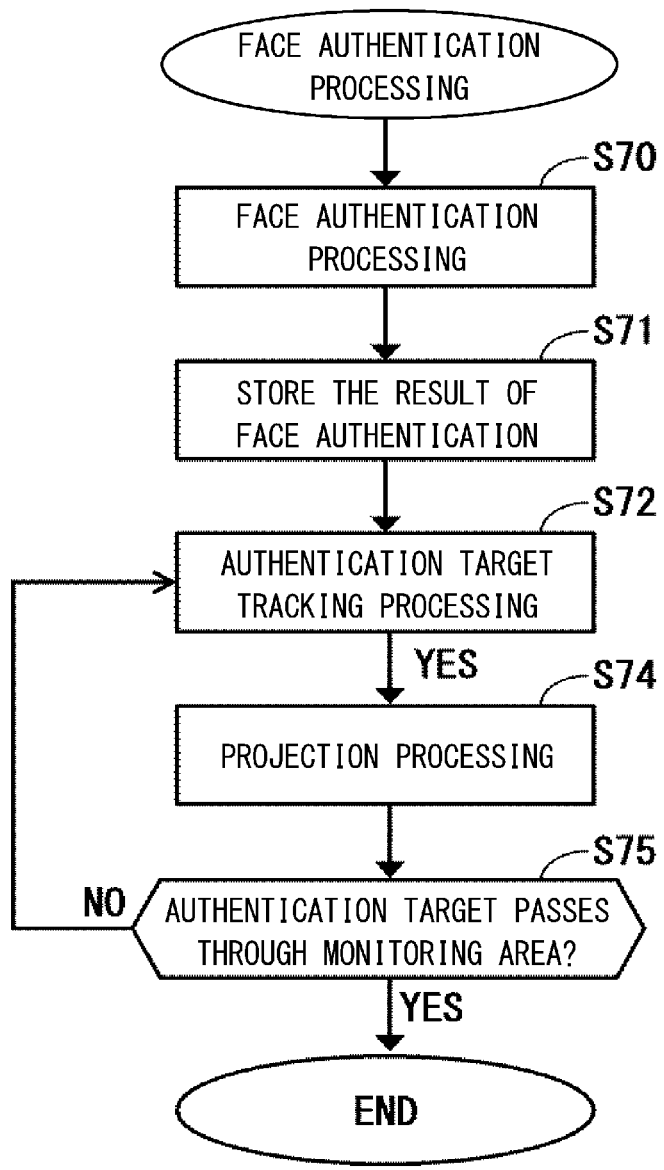
FIG. 23 is an operation flow (outline) of Embodiment 4.
Figure 24:
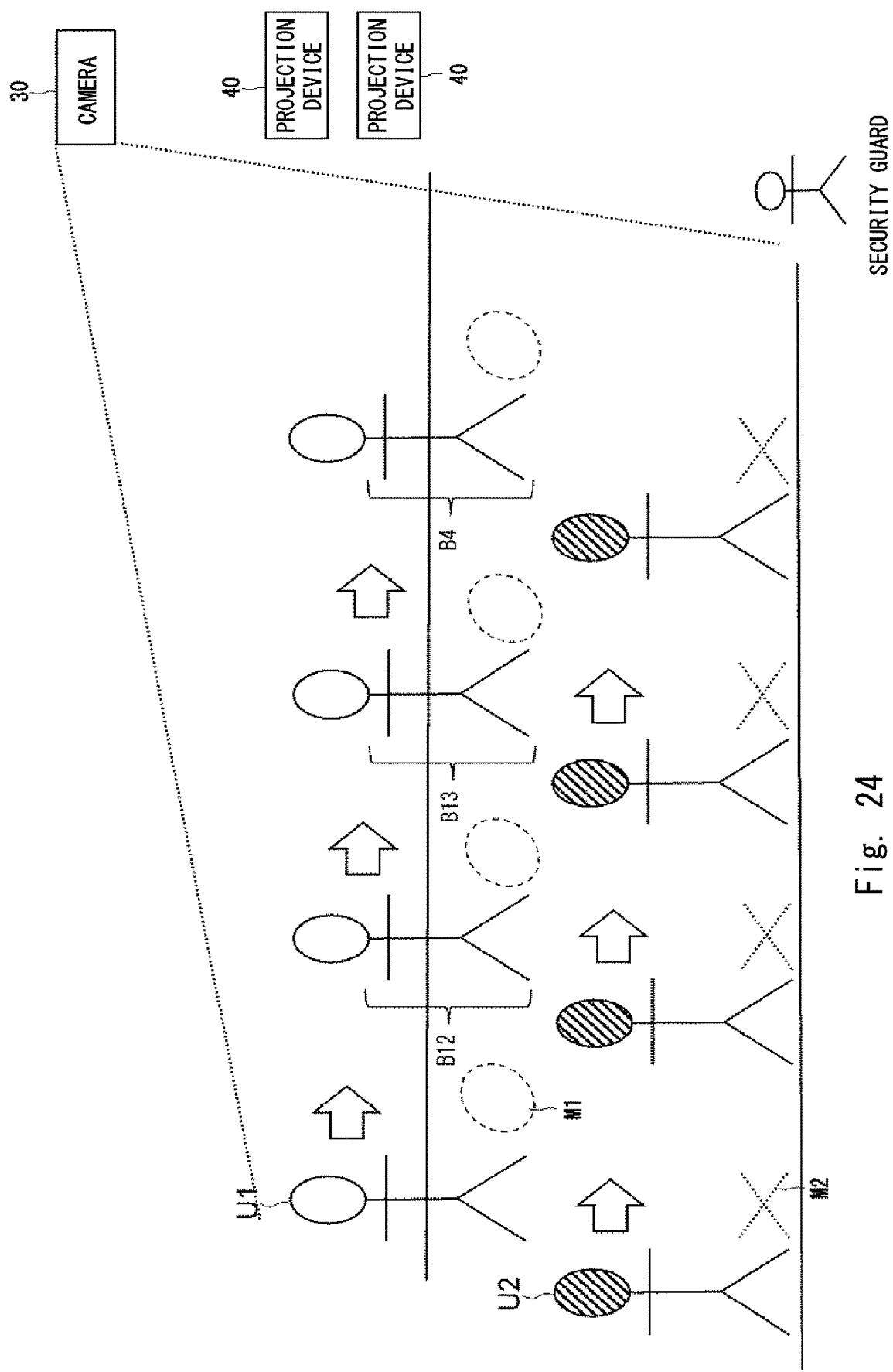
FIG. 24 is a diagram showing an example of projecting the face authentication results M1 and M2 of the authentication object persons U1 and U2 walking in the monitoring area.

FIG. 23 is an operation flow (outline) of Embodiment 4 FIG. 24 is a diagram showing an example of projecting the face authentication results M1 and M2 of the authentication object persons U1 and U2 walking in the monitoring area.

Hereinafter, the same processes as those in FIG. 17 are denoted by the same reference numerals and the description thereof is omitted.

First, the face authentication processing of the authentication object persons U1 and U2 is executed (Step S70).

Next, the result of the face authentication is stored (Step S71).

Next, a tracking processing for tracking the authentication object person is executed (Step S72).

Next, the projection area is specified, and projection processing for projecting the results M1 and M2 (see FIG. 24) of the face authentication on the specified projection area is executed (Step S74). For example, as shown in FIG. 24, for the authentication object person U1 whose face authentication is successful, even when the authentication object person U1 walks, the result M1 of the face authentication (graphic information representing a circle resembling the letter o representing success of authentication) can be projected on an area on the floor surface which is a predetermined distance away from the authentication object person U1 in the walking direction. For the authentication object person U2 whose face authentication has failed, even if the authentication object person U1 walks, the result M2 (graphic information representing a cross resembling the letter x representing authentication failure) of the face authentication can be projected on an area on the floor surface which is separated from the authentication object person U1 by a predetermined distance in the walking direction.

The processes of steps S72 and S74 are repeatedly executed until the authentication object persons U1 and U2 pass through the monitoring area (Step S75: NO). If the authentication object persons U1 and U2 pass through the monitoring area (Step S76: YES), the process ends.

As described above, according to Embodiment 4, the authentication result can be projected (alarmed) in association with the authentication object person (see FIG. 24).

According to Embodiment 4, even when the authentication object persons U1 and U2 walk, the results M1 and M2 of the face authentication can always be projected on an area on the floor which is separated from the authentication object persons U1 and U2 by a predetermined distance in the walking direction (FIG. 24). As a result, the correspondence between the authentication object person during walking and the authentication result becomes easy, and the monitoring load of a security guard is reduced.

Further, according to Embodiment 4, since the result of the face authentication is stored in Step S710, the result of the face authentication (the result stored in Step S710) can be projected correctly even if the situation becomes unsuitable for the face authentication due to the fact that the person to be authenticated faces down or the like in the subsequent tracking processing of the person to be authenticated (Step S72).

Further, according to Embodiment 4, since the result of the face authentication is stored in Step S710 and the face authentication is not executed thereafter, the authentication cost can be suppressed.

Next, a modified example will be described.

In Embodiment 2-4, an example has been described in which the projection area specification unit 22f specifies an area separated by a predetermined distance from the authentication object person included in the image acquired by the image acquisition unit 22a as the projection area, but this is not limited thereto. For example, the projection area specification unit 22f may specify an area including the authentication object person included in the image acquired by the image acquisition unit 22a as the projection area. The projection device 40 may project a specific color in the specified area. For example, if the face authentication is successful, blue or green light may be projected on the specified area, and if the face authentication is unsuccessful, red light may be projected on the specified area in a blinking manner.

Figure 25:
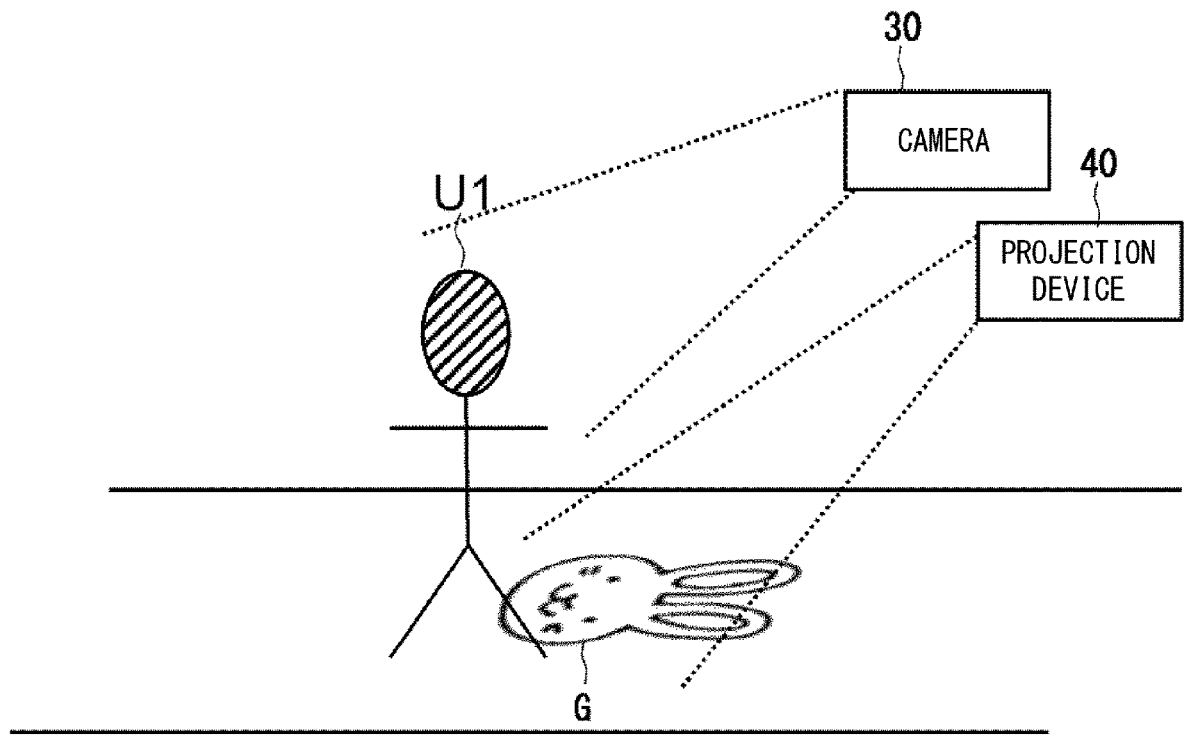
FIG. 25 shows an example in which an avatar image G (privacy protection information) is projected in place of projection information (For example, graphic information representing a circle resembling the letter o) indicating that face authentication is successful.

Although Embodiment 2-4 has described an example in which the result of the face authentication projected on the projection area specified by the projection area specification means is projection information indicating that the face authentication has succeeded (For example, graphic information representing a circle resembling the letter o) or projection information indicating that the face authentication has failed (for example, graphic information representing a cross resembling the letter x), it is not limited thereto. For example, as shown in FIG. 25, the avatar image G (privacy protection information) may be projected instead of the projection information (For example, graphic information representing a circle resembling the letter o) indicating that the face authentication is successful.

The avatar image G can be specified and projected as follows.

Figure 26:
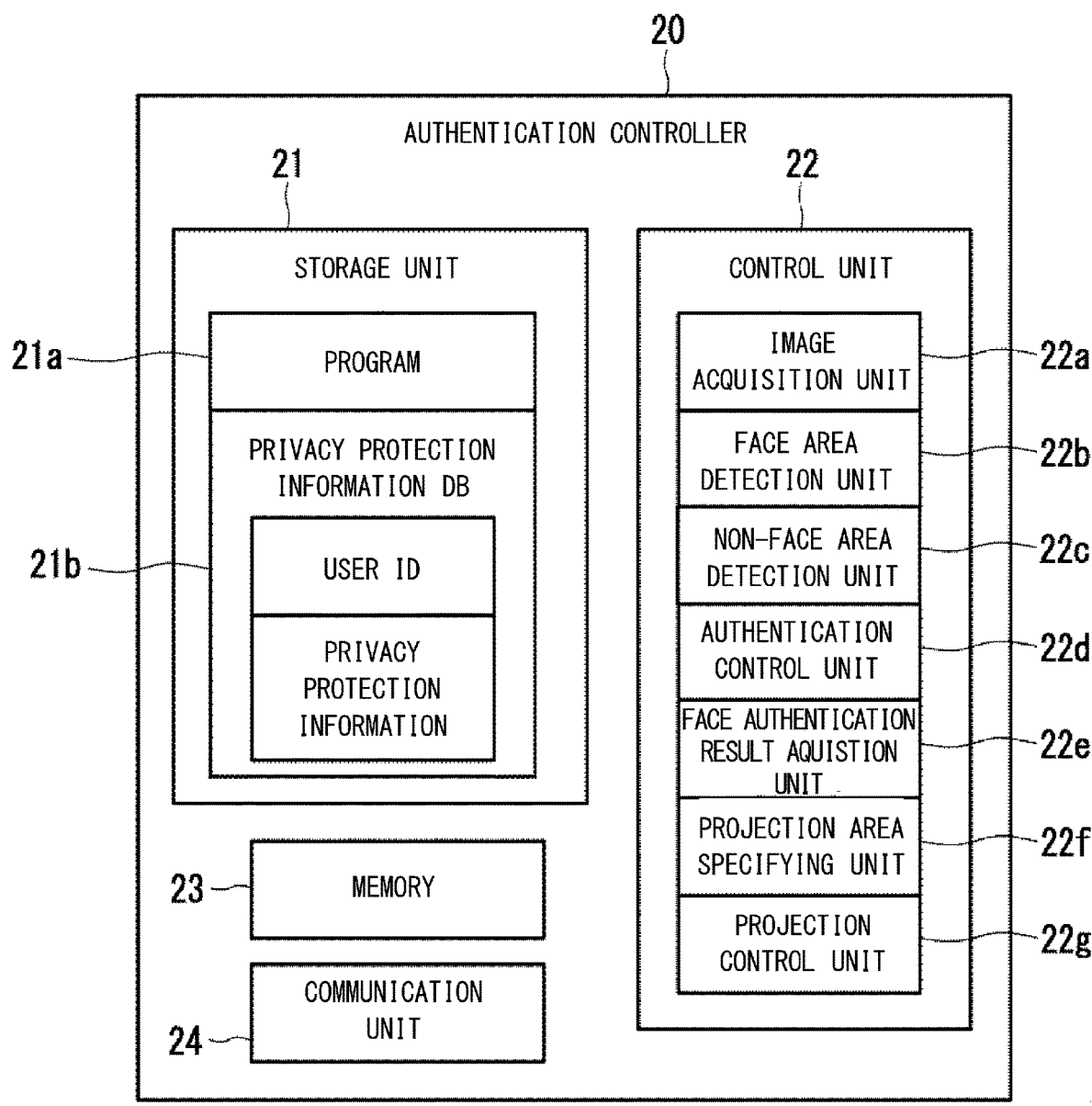
FIG. 26 is a schematic configuration diagram of the authentication control device 20 (modified example).

First, as shown in FIG. 26, the privacy protection information DB 21b is added to the storage unit 21 of the authentication control device 20 shown in FIG. 10. A privacy protection information DB 21a stores (registers) user IDs (plural) and privacy protection information of the user (authentication object person) in association with each other. The privacy protection information DB 21b is not limited to the authentication control device 20, and may be provided outside the authentication control device 20.

The privacy protection information is information for notifying a person to whom face authentication has succeeded that his/her face authentication has succeeded, and information that does not include his/her personal information (For example, your name and company name). The privacy protection information includes information registered by an authentication object person (user) to know that the face authentication of the user is successful. For example, the privacy protection information is an image such as an avatar image. The avatar image can be registered in the privacy protection information DB 21b when, for example, an authentication object person designates (or selects) the avatar image at a registration terminal (not shown) connected to the network NW. The avatar image is an image including a character that is an alter ego of the authentication object person. A character denoted by a symbol G in FIG. 25 is an example of an avatar image. The character may be any character. For example, the character may be an organism (E.G., people, animals, plants) or an inanimate object (For example, buildings, landscapes). Organisms and inanimate objects may or may not exist. The character may or may not be anthropomorphized. The character may be represented in two dimensions or in three dimensions. Further, the character may be a moving image or a still image. The privacy protection information may be "information associated with the authenticated person in advance", "information determined for each authenticated person", or "information specific to the authenticated person".

The avatar image G (privacy protection information) can be specified as follows.

For example, in Embodiment 2 (the same as Embodiment 4), since the user ID of the authentication object person whose face authentication is successful is acquired (see Step S34 in FIG. 11), privacy protection information associated with the user ID acquired in Step S34 in the storage unit 21 (privacy protection information DB 21b) can be specified. The authentication control device 20 (the projection control unit 22g) transmits a projection instruction for displaying the specified privacy protection information to the projection device 40 via the communication unit 24. Thus, the authentication control device 20 (the projection control unit 22g) can cause the projection device 40 to project the privacy protection information. This projection instruction includes the specified privacy protection information (projection information) and the projection area specified in Step S38 in FIG. 11.

Further, in Embodiment 3, since the user ID of the authentication object person whose face authentication is successful is acquired (see Step S704 in FIG. 20), the privacy protection information associated with the user ID acquired in Step S704 in the storage unit 21 (privacy protection information DB 21b) can be specified. The specified privacy protection information is stored (registered) in the storage unit 21 in association with the body shape feature information extracted in Step S709 in FIG. 20 (see Step S710 in FIG. 20). Then, the authentication control device 20 (the projection control unit 22g) transmits a projection instruction for displaying the specified privacy protection information to the projection device 40 via the communication unit 24. Thus, the authentication control device 20 (the projection control unit 22g) can cause the projection device 40 to project the privacy protection information (see Step S742 in FIG. 22). This projection instruction includes the specified privacy protection information (projection information) and the projection area specified in Step S741 in FIG. 22.

Although Embodiment 1-4 has described an example in which the authentication system 1 is composed of the authentication device 10, the authentication control device 20, the camera 30, and the projection device 40 which can communicate with each other via a network NW (For example, the Internet), it is not limited thereto.

For example, all or part of the configuration or functions of the authentication device 10, the camera 30, and the projection device 40 may be added to the authentication control device 20.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

All the numeral values mentioned in the above-described example embodiments are merely examples, and needless to say, numeral values different from them can be uses as desired.

The above-described example embodiments are merely examples in all the aspects thereof. The present invention should not be limited by the descriptions of the above-described example embodiments. The present invention may be carried out in various other forms without departing from the spirit or main features of the invention.

The whole or part of the example embodiment disclosed above can be described as, but not limited to, the following supplementary notes.

(Supplementary Note 1)

An authentication control device comprising:
- an image acquisition means for acquiring an image including an authentication object person walking in the monitoring area photographed by a camera for photographing the monitoring area;
- an authentication control means for causing an authentication device for performing face authentication to perform face authentication of the authentication object person included in the image acquired by the image acquisition means;
- a projection area specification means for specifying a projection area in which the result of the face authentication is projected; and
- a projection control means for causing the projection device to project the result of the face authentication on the projection area specified by the projection area specification means.

(Supplementary Note 2)

The authentication control device according to Supplementary note 1, further comprising:
- an authentication object person tracking means for tracking the authentication object person; wherein
- the projection area specification means specifies the projection area of the authentication object person tracked by the authentication object person tracking means.

(Supplementary Note 3)

The authentication control device according to Supplementary note 2, wherein
- the authentication object person tracking means tracks a non-face area other than the face of the authentication object person included in the image acquired by the image acquisition means.

(Supplementary Note 4)

The authentication control device according to Supplementary note 1, further comprising:
- a feature information extraction means for extracting feature information of the non-face area from the non-face area other than the face of the authentication object person included in the image acquired by the image acquiring means;
- a registration means for registering the feature information of the non-face area extracted by the feature information extraction means and the result of the face authentication in association with each other;

a verification means for verifying the feature information extracted by the feature information extraction means against the feature information registered by the registration means;

the image acquisition means acquires a first image and a second image captured after the first image is captured as the image, the authentication control means causes the authentication device to perform face authentication of the authentication object person included in the first image acquired by the image acquisition means, the feature information extraction means extracts first feature information of the non-face area from the non-face area other than the face of the authentication object person included in the first image acquired by the image acquisition means, and extracts second feature information of the non-face area from the non-face area other than the face of the authentication object person included in the second image acquired by the image acquisition means, the registration means registers the first feature information extracted by the feature information extraction means in association with the result of the face authentication, the verification means verifies the second feature information extracted by the feature information extraction means against the first feature information registered by the registration means, and the projection control means causes the projection device to project the result of the face authentication registered by the registration means on the projection area specified by the projection area specification means.

(Supplementary Note 5)

The authentication control device according to any one of Supplementary notes 1 to 4, further comprising:

a face area detecting means for performing face area detection processing for detecting a face area of the authentication object person included in the image acquired by the image acquiring means; wherein the projection control means causes the projection device to project the fact that the face area cannot be detected on the projection area specified by the projection area specification means when the face area detection processing by the face area detecting means fails to detect the face area of the authentication object person.

(Supplementary Note 6)

The authentication control device according to any one of Supplementary notes 1 to 5, wherein the projection area specification means specifies, as the projection area, an area separated by a predetermined distance from the authentication object person included in the image acquired by the image acquiring means.

(Supplementary Note 7)

The authentication control device according to Supplementary note 6, wherein the area separated by a predetermined distance is an area on a floor surface separated by a predetermined distance in a walking direction from the authentication object person.

(Supplementary Note 8)

The authentication control device according to any one of Supplementary notes 1 to 5, wherein the projection area specification means specifies, as the projection area, an area including the authentication object person included in the image acquired by the image acquiring means.

(Supplementary Note 9)

The authentication control device according to any one of Supplementary notes 1 to 8, wherein the projection control means causes the projection device to project privacy protection information of the authentication object person whose face authentication is successful as a result of the face authentication on the projection area specified by the projection area specification means, when the face authentication is successful.

(Supplementary Note 10)

An authentication control device comprising:

an image acquisition means for acquiring an image including an authentication object person walking toward a projection zone in the monitoring area photographed by a camera for photographing the monitoring area;

an authentication control means for causing an authentication device for performing face authentication to perform face authentication of the authentication object person included in the image acquired by the image acquisition means; and a projection control means for causing the projection device to project the result of the face authentication to the projection zone, when the authentication object person included in the image acquired by the image acquisition means reaches the projection zone.

(Supplementary Note 11)

The authentication control device according to Supplementary note 10, further comprising:

a projection area specification means for specifying a projection area on which the result of the face authentication is projected in the projection zone;

the projection control means causes the projection device to project the result of the face authentication on the projection area specified by the projection area specification means when the authentication object person included in the image acquired by the image acquiring means reaches the projection zone.

(Supplementary Note 12)

The authentication control device according to Supplementary note 10 or 11, further comprising:

an authentication object person tracking means for tracking the authentication object person;

the projection area specification means specifies the projection area of the authentication object person tracked by the authentication object person tracking means.

(Supplementary Note 13)

The authentication control device according to Supplementary note 12, wherein the authentication object person tracking means tracks a non-face area other than the face of the authentication object person included in the image acquired by the image acquiring means.

(Supplementary Note 14)

The authentication control device according to Supplementary note 11, further comprising:

a feature information extraction means for extracting feature information of the non-face area from the non-face area other than the face of the authentication object person included in the image acquired by the image acquiring means;

a registration means for registering the feature information of the non-face area extracted by the feature information extraction means and the result of the face authentication in association with each other;

a verification means for verifying the feature information extracted by the feature information extraction means against the feature information registered by the registration means; wherein the image acquisition means acquires a first image and a second image captured after the first image is captured as the image, the authentication control means causes the authentication device to perform face authentication of the authentication object person included in the first image acquired by the image acquisition means, the feature information extraction means extracts first feature information of the non-face area from the non-face area other than the face of the authentication object person included in the first image acquired by the image acquisition means, and extracts second feature information of the non-face area from the non-face area other than the face of the authentication object person included in the second image acquired by the image acquisition means, the registration means registers the first feature information extracted by the feature information extraction means in association with the result of the face authentication, the verification means verifies the second feature information extracted by the feature information extraction means against the first feature information registered by the registration means, and the projection control means causes the projection device to project the result of the face authentication registered by the registration means on the projection area specified by the projection area specification means when the authentication object person whose verification result by the verification means matches reaches the projection zone.

(Supplementary Note 15)

The authentication control device according to any one of Supplementary notes 10 to 14, wherein the projection area specification means specifies, as the projection area, an area which is a predetermined distance away from the authentication object person who has reached the projection zone.

(Supplementary Note 16)

The authentication control device according to Supplementary note 15, wherein the area separated by a predetermined distance is an area on a floor surface separated by a predetermined distance in a walking direction from the authentication object person.

(Supplementary Note 17)

The authentication control device according to any one of Supplementary notes 10 to 14, wherein the projection area specification means specifies, as the projection area, an area including the authentication object person who has reached the projection zone.

(Supplementary Note 18)

The authentication control device according to any one of Supplementary notes 7 to 17, wherein the projection control means causes the projection device to project privacy protection information of the authentication object person whose face authentication is successful as a result of the face authentication on the projection area specified by the projection area specification means, when the face authentication is successful.

(Supplementary Note 19)

An authentication system comprising:

a camera for photographing a monitoring area;

a projection device;

an authentication device for performing face authentication;

an image acquisition means for acquiring an image including an authentication object person walking in the monitoring area photographed by the camera;

an authentication control means for causing the authentication device to perform face authentication of the authentication object person included in the image acquired by the image acquisition means;

a projection area specification means for specifying a projection area in which the result of the face authentication is projected; and a projection control means for causing the projection device to project the result of the face authentication on the projection area specified by the projection area specification means.

(Supplementary Note 20)

The authentication system according to Supplementary note 19, wherein the camera, the projection device, the authentication device, and the authentication control device can communicate with each other via a network, the image acquisition means, the authentication control means, the projection area specification means, and the projection control means are provided in the authentication control device.

(Supplementary Note 21)

An authentication system comprising:

a camera for photographing a monitoring area;

a projection device;

an authentication device for performing face authentication;

an image acquisition means for acquiring an image including an authentication object person walking toward a projection zone in the monitoring area photographed by the camera;

an authentication control means for causing the authentication device to perform face authentication of the authentication object person included in the image acquired by the image acquisition means; and a projection control means for causing the projection device to project the result of the face authentication to the projection zone, when the authentication object person included in the image acquired by the image acquisition means reaches the projection zone.

(Supplementary Note 22)

The authentication system according to Supplementary note 21, wherein the camera, the projection device, the authentication device, and the authentication control device can communicate with each other via a network, the image acquisition means, the authentication control means, and the projection control means are provided in the authentication control device.

(Supplementary Note 23)

An authentication control method comprising:

an image acquisition step of acquiring an image including an authentication object person walking in the monitoring area photographed by a camera for photographing the monitoring area;

an authentication control step of causing an authentication device for performing face authentication to perform face authentication of the authentication object person included in the image acquired by the image acquisition step;

a projection area specification step of specifying a projection area in which the result of the face authentication is projected; and a projection control step of causing the projection device to project the result of the face authentication on the projection area specified by the projection area specification step.

(Supplementary Note 24)

An authentication control method comprising:

an image acquisition step of acquiring an image including an authenticated subject walking toward a projection zone in the monitoring area photographed by a camera for photographing the monitoring area;

an authentication control step of causing an authentication device for performing face authentication to perform face authentication of the authentication object person included in the image acquired by the image acquisition step; and a projection control step for causing the projection device to project the result of the face authentication to the projection zone, when the authentication object person included in the image acquired by the image acquisition step reaches the projection zone.

(Supplementary Note 25)

A non-transitory computer readable medium storing a program for causing an electronic device having at least one processor to execute:

an image acquisition processing for acquiring an image including an authentication object person walking in the monitoring area photographed by a camera for photographing the monitoring area;

an authentication control processing for causing an authentication device for performing face authentication to perform face authentication of the authentication object person included in the image acquired by the image acquisition processing;

a projection area specification processing for specifying a projection area in which the result of the face authentication is projected; and a projection control processing for causing the projection device to project the result of the face authentication on the projection area specified by the projection area specification processing.

(Supplementary Note 26)

A non-transitory computer readable medium storing a program for causing an electronic device having at least one processor to execute:

an image acquisition processing for acquiring an image including an authenticated subject walking toward a projection zone in the monitoring area photographed by a camera for photographing the monitoring area;

an authentication control processing for causing an authentication device for performing face authentication to perform face authentication of the authentication object person included in the image acquired by the image acquisition processing; and a projection control processing for causing the projection device to project the result of the face authentication to the projection zone, when the authentication object person included in the image acquired by the image acquisition processing reaches the projection zone.

REFERENCE SIGNS LIST

1 AUTHENTICATION SYSTEM
10 AUTHENTICATION DEVICE
11 STORAGE UNIT
11a PROGRAM
11b FACE INFORMATION DB
12 CONTROL UNIT
12a IMAGE ACQUISITION UNIT
12b FACE DETECTION UNIT
12c FEATURE POINT EXTRACTION UNIT
12d REGISTRATION UNIT
12e AUTHENTICATION UNIT
13 MEMORY
14 COMMUNICATION UNIT
20 AUTHENTICATION CONTROL UNIT
21 STORAGE UNIT
21a PROGRAM
21b PRIVACY PROTECTION INFORMATION DB
22 CONTROL UNIT
22a IMAGE ACQUISITION UNIT (IMAGE ACQUISITION MEANS)
22b FACE AREA DETECTION UNIT
22c NON-FACE AREA DETECTION UNIT
22d AUTHENTICATION CONTROL UNIT (AUTHENTICATION CONTROL MEANS)
22e FACE AUTHENTICATION RESULT ACQUISITION UNIT
22f PROJECTION AREA SPECIFICATION UNIT (PROJECTION AREA SPECIFICATION MEANS)
22g PROJECTION CONTROL UNIT (PROJECTION CONTROL MEANS)
23 MEMORY
24 COMMUNICATION UNIT
30 CAMERA
40 PROJECTION DEVICE
G AVATAR IMAGE
NW NETWORK
U1, U2 AUTHENTICATION OBJECT
Z1 AUTHENTICATION ZONE
Z2 PROJECTION ZONE

What is claimed is:

1. An authentication control device comprising:

at least one memory storing instructions, and at least one processor configured to execute the instructions to;

acquire an image including an authentication object person walking in a monitoring area photographed by a camera for photographing the monitoring area;

cause an authentication device for performing face authentication to perform face authentication of the authentication object person included in the image acquired;

specify a projection area in which a result of the face authentication is projected; and cause a projection device to project the result of the face authentication on the projection area specified;

extract feature information of a non-face area from the non-face area other than the face of the authentication object person included in the image;

register the feature information of the non-face area extracted and the result of the face authentication in association with each other;

verify the feature information extracted against the feature information registered;

acquire a first image and a second image captured after the first image is captured as the image;

cause the authentication device to perform face authentication of the authentication object person included in the first image;

extract first feature information of the non-face area from the non-face area other than the face of the authentication object person included in the first image, and extract second feature information of the non-face area from the non-face area other than the face of the authentication object person included in the second image;

register the first feature information extracted in association with the result of the face authentication;

verify the second feature information extracted against the first feature information registered; and cause the projection device to project the result of the face authentication registered on the projection area specified.

2. The authentication control device according to claim 1, wherein
the at least one processor is further configured to execute the instructions to track the authentication object person;
specify the projection area of the authentication object person tracked.

3. The authentication control device according to claim 2, wherein
the at least one processor is further configured to execute the instructions to track a non-face area other than the face of the authentication object person included in the image acquired.

4. The authentication control device according to claim 1, wherein
the at least one processor is further configured to execute the instructions to perform face area detection processing for detecting a face area of the authentication object person included in the image acquired;
cause the projection device to project a fact that the face area cannot be detected on the projection area specified when the face area detection processing fails to detect the face area of the authentication object person.

5. The authentication control device according to claim 1, wherein
the at least one processor is further configured to execute the instructions to specify, as the projection area, an area separated by a predetermined distance from the authentication object person included in the image acquired.

6. The authentication control device according to claim 5, wherein
the area separated by a predetermined distance is an area on a floor surface separated by a predetermined distance in a walking direction from the authentication object person.

7. The authentication control device according to claim 1, wherein
the at least one processor is further configured to execute the instructions to specify, as the projection area, an area including the authentication object person included in the image acquired.

8. The authentication control device according to claim 1, wherein
the at least one processor is further configured to execute the instructions to cause the projection device to project privacy protection information of the authentication object person whose face authentication is successful as a result of the face authentication on the projection area specified, when the face authentication is successful.

9. An authentication control device comprising:
at least one memory storing instructions, and
at least one processor configured to execute the instructions to;

acquire an image including an authentication object person walking toward a projection zone in a monitoring area photographed by a camera for photographing the monitoring area;

cause an authentication device for performing face authentication to perform face authentication of the authentication object person included in the image acquired; and cause a projection device to project a result of the face authentication to the projection zone, when the authentication object person included in the image acquired reaches the projection zone;

extract feature information of a non-face area from the non-face area other than the face of the authentication object person included in the image;

register the feature information of a non-face area extracted and the result of the face authentication in association with each other;

verify the feature information extracted against the feature information registered;

acquire a first image and a second image captured after the first image is captured as the image;

cause the authentication device to perform face authentication of the authentication object person included in the first image;

extract first feature information of the non-face area from the non-face area other than the face of the authentication object person included in the first image, and extract second feature information of the non-face area from the non-face area other than the face of the authentication object person included in the second image;

register the first feature information extracted in association with the result of the face authentication;

verify the second feature information extracted against the first feature information registered; and cause the projection device to project the result of the face authentication registered on the projection area specified when the authentication object person whose verification result matches reaches the projection zone.

10. The authentication control device according to claim 9, wherein
the at least one processor is further configured to execute the instructions to specify a projection area on which the result of the face authentication is projected in the projection zone;
cause the projection device to project the result of the face authentication on the projection area specified when the authentication object person included in the image acquired reaches the projection zone.

11. The authentication control device according to claim 9, wherein
the at least one processor is further configured to execute the instructions to track the authentication object person;
specify the projection area of the authentication object person tracked.

12. The authentication control device according to claim 11, wherein
the at least one processor is further configured to execute the instructions to track a non-face area other than the face of the authentication object person included in the image acquired.

13. The authentication control device according to claim 9, wherein
the at least one processor is further configured to execute the instructions to specify, as the projection area, an area which is a predetermined distance away from the authentication object person who has reached the projection zone.

14. The authentication control device according to claim 13, wherein
the area separated by a predetermined distance is an area on a floor surface separated by a predetermined distance in a walking direction from the authentication object person.

15. The authentication control device according to claim 9, wherein
the at least one processor is further configured to execute the instructions to specify, as the projection area, an area including the authentication object person who has reached the projection zone.

16. The authentication control device according to claim 6, wherein
the at least one processor is further configured to execute the instructions to cause the projection device to project privacy protection information of the authentication object person whose face authentication is successful as a result of the face authentication on the projection area specified, when the face authentication is successful.

17. An authentication system comprising:
a camera for photographing a monitoring area;
a projection device;
an authentication device for performing face authentication;
an image acquisition means for acquiring an image including an authentication object person walking in the a monitoring area photographed by the camera;
an authentication control means for causing the authentication device to perform face authentication of the authentication object person included in the image acquired by the image acquisition means;
a projection area specification means for specifying a projection area in which a result of the face authentication is projected;
a projection control means for causing the projection device to project the result of the face authentication on the projection area specified by the projection area specification means;
at least one memory storing instructions; and
at least one processor configured to execute the instructions to:
extract feature information of a non-face area from the non-face area other than the face of the authentication object person included in the image;
register the feature information of the non-face area extracted and the result of the face authentication in association with each other;
verify the feature information extracted against the feature information registered;
acquire a first image and a second image captured after the first image is captured as the image;
cause the authentication device to perform face authentication of the authentication object person included in the first image;
extract first feature information of the non-face area from the non-face area other than the face of the authentication object person included in the first image, and extract second feature information of the non-face area from the non-face area other than the face of the authentication object person included in the second image;
register the first feature information extracted in association with the result of the face authentication;

verify the second feature information extracted against the first feature information registered; and
cause the projection device to project the result of the face authentication registered on the projection area specified.

18. The authentication system according to claim 17, wherein
the camera, the projection device, the authentication device, and the authentication control device can communicate with each other via a network,
the image acquisition means, the authentication control means, the projection area specification means, and the projection control means are provided in the authentication control device.

19. An authentication system comprising:
a camera for photographing a monitoring area;
a projection device;
an authentication device for performing face authentication;
an image acquisition means for acquiring an image including an authentication object person walking toward a projection zone in the monitoring area photographed by the camera;
an authentication control means for causing the authentication device to perform face authentication of the authentication object person included in the image acquired by the image acquisition means;
a projection control means for causing the projection device to project a result of the face authentication to the projection zone, when the authentication object person included in the image acquired by the image acquisition means reaches the projection zone;
at least one memory storing instructions; and
at least one processor configured to execute the instructions to:
extract feature information of a non-face area from the non-face area other than the face of the authentication object person included in the image;
register the feature information of the non-face area extracted and the result of the face authentication in association with each other;
verify the feature information extracted against the feature information registered;
acquire a first image and a second image captured after the first image is captured as the image;
cause the authentication device to perform face authentication of the authentication object person included in the first image;
extract first feature information of the non-face area from the non-face area other than the face of the authentication object person included in the first image, and extract second feature information of the non-face area from the non-face area other than the face of the authentication object person included in the second image;
register the first feature information extracted in association with the result of the face authentication;
verify the second feature information extracted against the first feature information registered; and
cause the projection device to project the result of the face authentication registered on the projection area specified when the authentication object person whose verification result matches reaches the projection zone.

20. The authentication system according to claim 19, wherein the camera, the projection device, the authentication device, and the authentication control device can communicate with each other via a network, the image acquisition means, the authentication control means, and the projection control means are provided in the authentication control device.

21. An authentication control method comprising:
an image acquisition step of acquiring an image including an authentication object person walking in a monitoring area photographed by a camera for photographing the monitoring area;
an authentication control step of causing an authentication device for performing face authentication to perform face authentication of the authentication object person included in the image acquired by the image acquisition step;
a projection area specification step of specifying a projection area in which a result of the face authentication is projected;
a projection control step of causing a projection device to project the result of the face authentication on the projection area specified by the projection area specification step;
a step of extracting feature information of a non-face area from the non-face area other than the face of the authentication object person included in the image;
a step of registering the feature information of the non-face area extracted and the result of the face authentication in association with each other;
a step of verifying the feature information extracted against the feature information registered;
a step of acquiring a first image and a second image captured after the first image is captured as the image;
a step of causing the authentication device to perform face authentication of the authentication object person included in the first image;
a step of extracting first feature information of the non-face area from the non-face area other than the face of the authentication object person included in the first image, and extracting second feature information of the non-face area from the non-face area other than the face of the authentication object person included in the second image;
a step of registering the first feature information extracted in association with the result of the face authentication;
a step of verifying the second feature information extracted against the first feature information registered; and
a step of causing the projection device to project the result of the face authentication registered on the projection area specified.

22. An authentication control method comprising:
an image acquisition step of acquiring an image including an authenticated subject walking toward a projection zone in a monitoring area photographed by a camera for photographing the monitoring area;
an authentication control step of causing an authentication device for performing face authentication to perform face authentication of an authentication object person included in the image acquired by the image acquisition step;
a projection control step for causing a projection device to project a result of the face authentication to the projection zone, when the authentication object person included in the image acquired by the image acquisition step reaches the projection zone;
a step of extracting feature information of a non-face area from the non-face area other than the face of the authentication object person included in the image;
a step of registering the feature information of the non-face area extracted and the result of the face authentication in association with each other;
a step of verifying the feature information extracted against the feature information registered;
a step of acquiring a first image and a second image captured after the first image is captured as the image;
a step of causing the authentication device to perform face authentication of the authentication object person included in the first image;
a step of extracting first feature information of the non-face area from the non-face area other than the face of the authentication object person included in the first image, and extracting second feature information of the non-face area from the non-face area other than the face of the authentication object person included in the second image;
a step of registering the first feature information extracted in association with the result of the face authentication;
a step of verifying the second feature information extracted against the first feature information registered; and
a step of causing the projection device to project the result of the face authentication registered on the projection area specified when the authentication object person whose verification result matches reaches the projection zone.

23. A non-transitory computer readable medium storing a program for causing an electronic device having at least one processor to execute:
an image acquisition processing for acquiring an image including an authentication object person walking in a monitoring area photographed by a camera for photographing the monitoring area;
an authentication control processing for causing an authentication device for performing face authentication to perform face authentication of the authentication object person included in the image acquired by the image acquisition processing;
a projection area specification processing for specifying a projection area in which a result of the face authentication is projected;
a projection control processing for causing a projection device to project the result of the face authentication on the projection area specified by the projection area specification processing;
a processing of extracting feature information of a non-face area from the non-face area other than the face of the authentication object person included in the image;
a processing of registering the feature information of the non-face area extracted and the result of the face authentication in association with each other;
a processing of verifying the feature information extracted against the feature information registered;
a processing of acquiring a first image and a second image captured after the first image is captured as the image;
a processing of causing the authentication device to perform face authentication of the authentication object person included in the first image;
a processing of extracting first feature information of the non-face area from the non-face area other than the face of the authentication object person included in the first image, and extracting second feature information of the non-face area from the non-face area other than the face of the authentication object person included in the second image;

a processing of registering the first feature information extracted in association with the result of the face authentication;

a processing of verifying the second feature information extracted against the first feature information registered; and a processing of causing the projection device to project the result of the face authentication registered on the projection area specified.

24. A non-transitory computer readable medium storing a program for causing an electronic device having at least one processor to execute:

an image acquisition processing for acquiring an image including an authenticated subject walking toward a projection zone in a monitoring area photographed by a camera for photographing the monitoring area;

an authentication control processing for causing an authentication device for performing face authentication to perform face authentication of an authentication object person included in the image acquired by the image acquisition processing;

a projection control processing for causing a projection device to project a result of the face authentication to the projection zone, when the authentication object person included in the image acquired by the image acquisition processing reaches the projection zone;

a processing of extracting feature information of a non-face area from the non-face area other than the face of the authentication object person included in the image;

a processing of registering the feature information of a non-face area extracted and the result of the face authentication in association with each other;

a processing of verifying the feature information extracted against the feature information registered;

a processing of acquiring a first image and a second image captured after the first image is captured as the image;

a processing of causing the authentication device to perform face authentication of the authentication object person included in the first image;

a processing of extracting first feature information of the non-face area from the non-face area other than the face of the authentication object person included in the first image, and extracting second feature information of the non-face area from the non-face area other than the face of the authentication object person included in the second image;

a processing of registering the first feature information extracted in association with the result of the face authentication;

a processing of verifying the second feature information extracted against the first feature information registered; and a processing of causing the projection device to project the result of the face authentication registered on the projection area specified when the authentication object person whose verification result matches reaches the projection zone.

* * * * *